(12) United States Patent
Chauville et al.

(10) Patent No.: US 7,379,561 B2
(45) Date of Patent: May 27, 2008

(54) METHOD AND SYSTEM FOR DIFFERENTIALLY AND REGULARLY MODIFYING A DIGITAL IMAGE BY PIXEL

(75) Inventors: Benoit Chauville, Paris (FR); Michael Kraak, Boulogne (FR); Frederic Guichard, Paris (FR)

(73) Assignee: DXO Labs, Boulogne Billancourt (FR)

( * ) Notice: Subject to any disclaimer, the term of this patent is extended or adjusted under 35 U.S.C. 154(b) by 245 days.

(21) Appl. No.: 10/573,157

(22) PCT Filed: Sep. 22, 2004

(86) PCT No.: PCT/FR2004/050455

§ 371 (c)(1),
(2), (4) Date: Mar. 23, 2006

(87) PCT Pub. No.: WO2005/031646

PCT Pub. Date: Apr. 7, 2005

(65) Prior Publication Data

US 2007/0110330 A1  May 17, 2007

(30) Foreign Application Priority Data

Sep. 23, 2003 (FR) .................................. 03 50596

(51) Int. Cl.
*G06K 9/00* (2006.01)

(52) U.S. Cl. ...................... 382/103; 382/274; 382/286; 382/275; 382/205; 382/241; 382/265; 382/261; 382/156; 382/157

(58) Field of Classification Search ............... 382/274, 382/286, 103, 157, 205, 261, 265, 156
See application file for complete search history.

(56) References Cited

U.S. PATENT DOCUMENTS 5,784,049 A * 7/1998 Hall ............................ 345/599

(Continued)

FOREIGN PATENT DOCUMENTS

EP         0 961 224         12/2001

OTHER PUBLICATIONS

Pizer, Stephen M. et al., "Adaptive Histogram Equalization and Its Variations", Computer Vision, Graphics, and Image Processing, vol. 39, No. 3, pp. 355-368, 1987.

*Primary Examiner*—Andrew W. Johns
*Assistant Examiner*—Nancy Bitar
(74) *Attorney, Agent, or Firm*—Oblon, Spivak, McClelland, Maier & Neustadt, P.C.

(57) ABSTRACT

Th invention relates to a method and system for modifying a digital image (100) consisting of pixels. Said digital image is divided into areas (103). At least one area value is assigned to each area Zi (103). At least one parameter value Vpij (203) is assigned to each of said areas (103). A set of couples (Zi, Vpij) forms a parameter image (201). The inventive method consists (a) in determining the determined parameter values Vpir for each area (103), the parameter image (201) being called determined parameter image, (b) in adjusting the determined parameter image by reducing the variations thereof, (c) in modifying pixel values (102) of the determined pixel (101) of said digital image (100) according to the parameter values (203) of said adjusted parameter image, whereby the digital image is differentially modified for each of said pixels and quasi regularly for contiguous areas.

30 Claims, 7 Drawing Sheets

Figure 1:
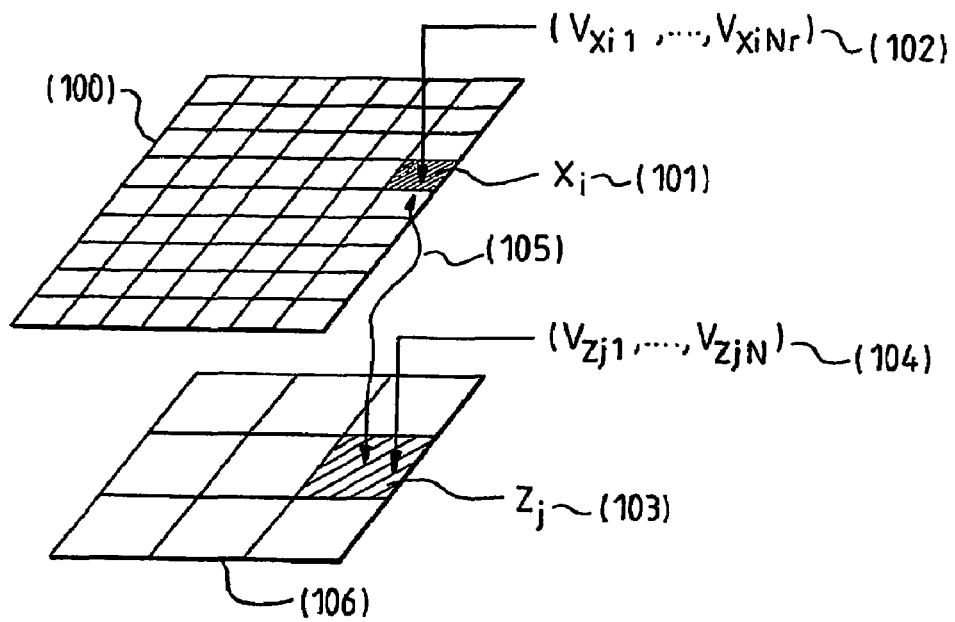

U.S. PATENT DOCUMENTS 6,108,455 A * 8/2000 Mancuso .................... 382/261
6,208,766 B1 * 3/2001 Schweyer et al. .......... 382/274
6,577,775 B1 * 6/2003 Li .............................. 382/274
6,693,669 B1 * 2/2004 Wu et al. ................... 348/254

* cited by examiner

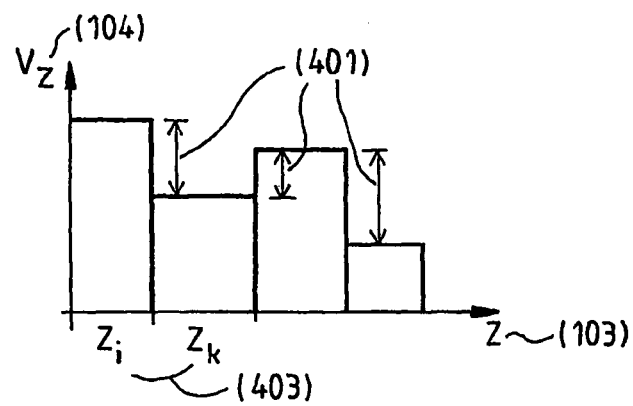
FIG.4a
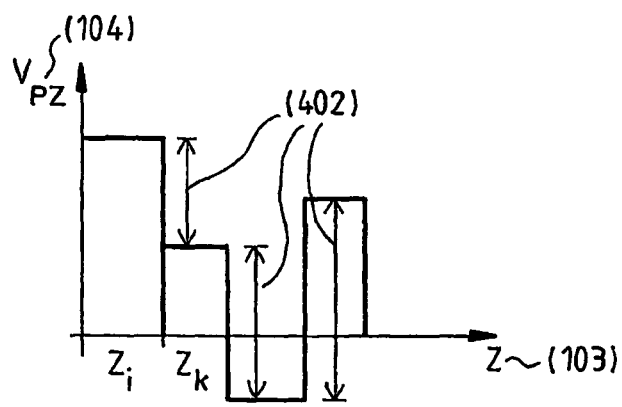
FIG.4b
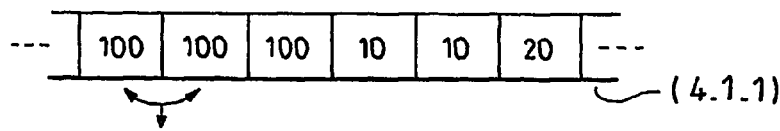
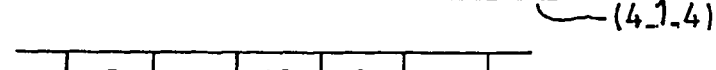
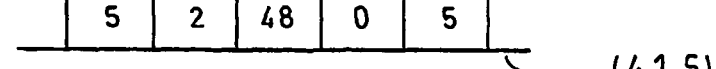
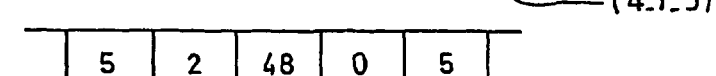
FIG.4c
FIG.4

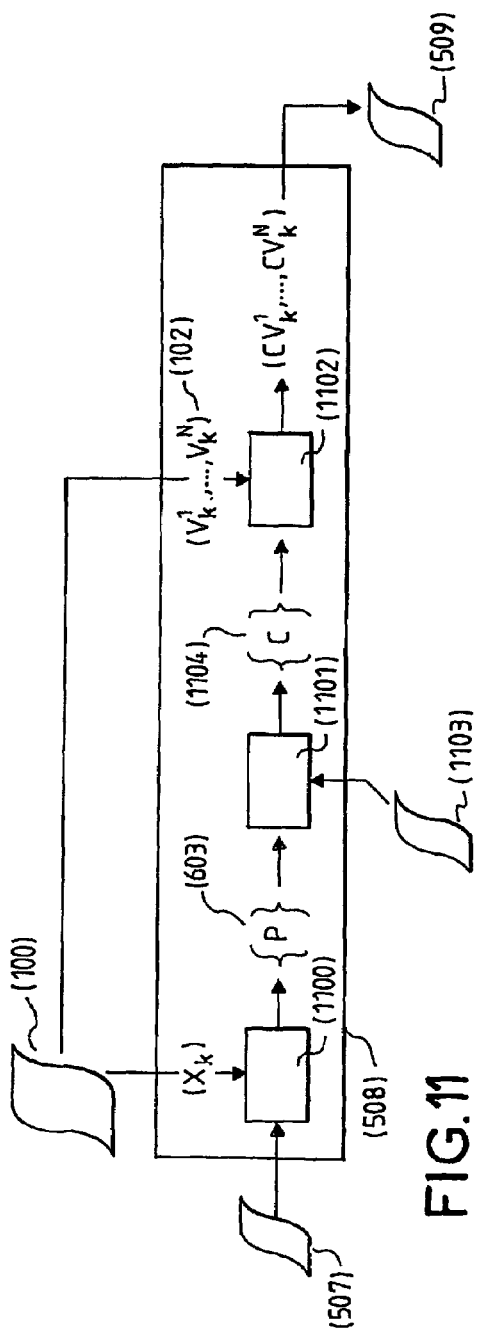
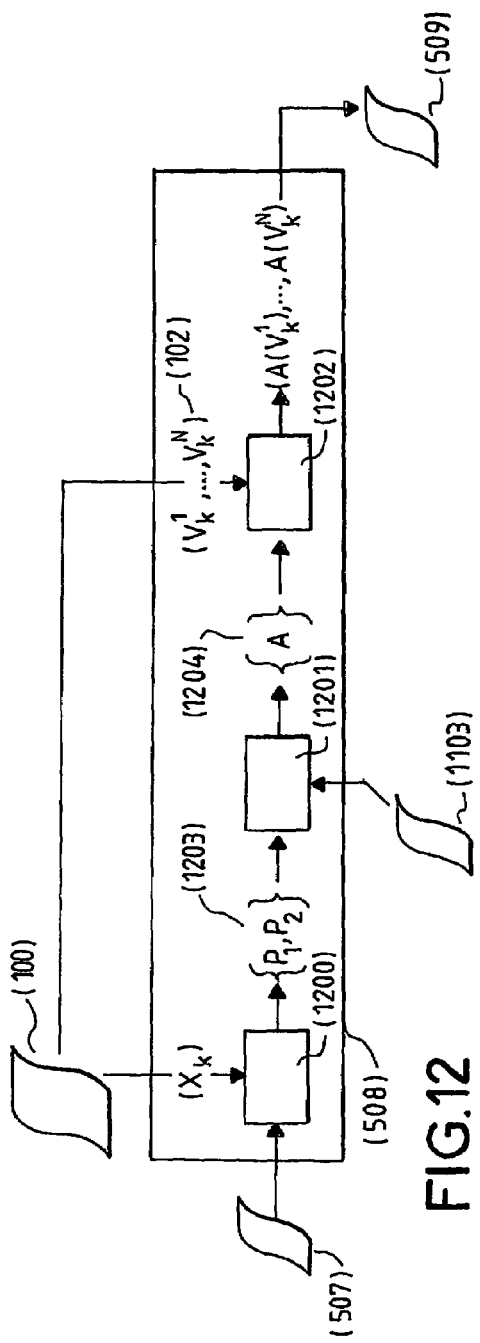
FIG.11
FIG.12

METHOD AND SYSTEM FOR DIFFERENTIALLY AND REGULARLY MODIFYING A DIGITAL IMAGE BY PIXEL

PREAMPLE OF THE DESCRIPTION

1. Field in Question, Problem Posed

The present invention relates to a method and a system for modifying a digital image differentially and quasi-regularly per pixel.

The method is aimed in particular at localizing any algorithm for modifying, especially improving, digital images normally acting uniformly on the image, while controlling the local variation of the modification in order to avoid creating visual artifacts. The invention relates in particular to algorithms for improving the contrast and to a procedure for localizing them.

2. Prior Art

There exist very numerous algorithms for modifying digital images as a function of parameters that depend on the digital image, the same parameter values being used to modify the values of all pixels of the image. As examples we cite algorithms for improving the contrast, particularly that described in the method described in International Patent Application FR02/14855, filed 27 Nov. 2002 in the name of the Vision IQ company and entitled: "Method and system for improving the contrast of digital images". In that application there is described a method for improving the contrast of a digital image wherein a modification of the digital image can be achieved by means of a correspondence table, the latter being determined as a function of quantities of details or of quantity of dark or bright pixels or of the white level or black level or of the histogram of pixel values of the digital image, etc. In this example of a method, the modification of the digital image is global, meaning that two pixels having the same pixel values will be modified in the same way. Also in this example, the correspondence table or the quantities permitting the determination thereof can be regarded as values of global parameters, because they determine, for the pixels of the image, a treatment independent of their position.

deblurring algorithms, in which the parameter or parameters can then be information relating to the cause of the blurring or to the quantity or statistics of noise, etc.

As it happens, it might be advantageous to modify each pixel of the digital image with parameter values that are different, for example, depending on the position of the pixel in the image.

We stipulate first of all that we are excluding a priori the algorithms for which all the parameter values are predetermined for each pixel and are independent of the content of the digital image. This is the case in particular of an algorithm for compensating for distortions (see, in particular, the method such as described in Patent Application WO03007238, "Method and System for Calculating a Transformed Image from a Digital Image"), or the algorithm for compensating for the blurring induced by the optics of the apparatus (see, in particular, the method such as described in Patent Application WO03007243, "Method and System for Modifying a Digital Image Taking into Account Its Noise"). In these cases, the distortion and/or the quantity of blurring induced by the optics are independent of the image, and they can be predetermined for each pixel in a manner independent of the content of the image for all images obtained from one and the same apparatus with fixed optical configuration.

The method and system that are the object of the invention aim to localize the algorithms for which at least the value of one of the parameters is determined and/or modified as a function of the content of the image. Certain classical techniques give such image-modifying algorithms a local character:

First of all there are interactive tools that give a user the option of cropping the part of the image to be modified. This solution does not guarantee that the modification of the designated part of the image will not generate visual "artifacts", especially at the edges of the cropped part. For example, the values of two contiguous pixels having similar values, one being in and the other not being in the cropped part of the image, will be modified differently, thus generating the impression of an "edge" between these two pixels that was not present in the initial image.

There is also a certain number of algorithms in which at least one parameter (whether implicit or explicit) varies as a function of each pixel. For example, in the digital images of photographic type, to compensate for under-exposure (or in similar manner for over-exposure) of part of the image, there can be subtracted from the value of a pixel x a value that is a function of the local mean of the values of the pixels situated in a vicinity of pixel x. In this example, the local mean is the parameter which, for each pixel, will determine the modification of these values. Such an algorithm is local, because the local mean defined in this way can vary from pixel to pixel. The effect of the algorithm on an image is the following: the pixel values of a too-bright part of the image, corresponding to high pixel values, are reduced. Similarly, the pixel values of a too-dark part of the image, corresponding to low pixel values, are enhanced. In this way the too-bright parts will be "darkened" and the too-dark parts will be "brightened". Nevertheless, a problem develops at the transitions between the bright parts and the dark parts of the image. In effect, such a modification causes a halo to appear along the transition. This halo is due to the fact that the parameter (in this case the local mean) varies outside the transition zone and in particular in zones in which the digital image varies little or not at all. The variation of the parameterization (in this case the local mean) induces a modification of the digital image, causing variations to appear where initially the digital image did not vary.

The method and system that are the object of the invention aim to avoid a situation in which a locally parameterized modification of the image generates this type of artifact. For that purpose, the parameterization is regularized, in such a way that these variations are in a sense that is smaller than that of the digital image.

SOLUTION

Method

The invention relates to a method for modifying a digital image composed of pixels having pixel values. The digital image is decomposed into zones. Each of the pixels is associated with at least one adjacent zone. At least one zone value is allocated to each of the zones Zi. At least one parameter value Vpij is allocated to each of the zones Zi. A set of pairs (Zi.Vpij), composed of a zone Zi and of a parameter value Vpij associated with the zone, constitutes a parameter image. The method includes the stage (a) of determining, for each zone, determined parameter values Vpir, in particular as a function of the zone values of the digital image. The parameter image formed in this way is referred to hereinafter as the determined parameter image. The zone values vary between at least one of the zones and a contiguous zone; this variation is referred to hereinafter as the variation of the digital image. The determined parameter values vary between the zone and at least one contiguous zone; this variation is referred to hereinafter as the variation of the determined parameter image.

The method additionally includes the stage (b) of regularizing the determined parameter image as a function of the variation of the digital image, by reducing the variations of the determined parameter image in order to produce a parameter image having a smaller variation level than that of the variations of the digital image. This parameter image is referred to hereinafter as the regularized parameter image.

The method additionally includes the stage (c) of modifying the pixel values of a determined pixel of the said digital image as a function of the parameter values of the said regularized parameter image, relative to the zones adjacent to the said determined pixel.

In this way the digital image is modified differentially for each of the said pixels and quasi-regularly for the contiguous zones.

Preferably, according to the invention, the method is such that each zone is composed of one pixel.

Preferably, according to the invention, the method is such that each zone is composed of a group of contiguous pixels.

Preferably, according to the invention, the determined parameter values are zone values.

Preferably, according to the invention, the zone value is the maximum value of the pixel values associated with the zone and/or the minimum value of the pixel values associated with the zone and/or a value calculated from the pixel values associated with the zone.

In the case of one alternative embodiment, a single determined parameter value has been allocated to each zone. Those parameter images whose variation level is smaller than that of the variations of the digital image are referred to hereinafter as controlled variation images. In the case of this alternative embodiment, it is preferable, according to the invention, in order to reduce the variations of the determined parameter image and to produce a regularized parameter image having a variation level smaller than that of the variations of the digital image, that the method additionally include the stage of selecting, from among the controlled variation images, a parameter image that is close (within the meaning of the present invention) to the determined parameter image. In this way there is obtained a parameter image constituting the regularized parameter image.

In the case of another alternative embodiment, a single determined parameter value is also allocated to each zone. The parameter images whose variation level is smaller than that of the variations of the digital image are referred to hereinafter as controlled variation images. In the case of this other alternative embodiment, it is preferable, according to the invention, in order to reduce the variations of the determined parameter image and to produce a regularized parameter image having a variation level smaller than that of the variations of the digital image, that the method additionally include the stage of selecting, from among the controlled variation images, a parameter image (c) (Zi.Vpi(c)) that satisfies the following conditions:

the determined parameter value (Vpij) of the determined parameter image of any zone (Zi) whatsoever is smaller than or equal to the parameter value (Vpi(c)) of the selected parameter image (c), at least for several zones, the parameter value (Vpi(c)) of the selected parameter image (c) of a zone (Zi) is smaller than or equal to the parameter values (Vpi(q)) for most of the controlled variation images (q) (Zi.Vpi(q)), at least for several zones.

It results from the combination of these technical features that there is obtained, in this way, a parameter image constituting the regularized parameter image.

In the case of another alternative embodiment, a single determined parameter value is allocated to each zone. The parameter images whose variation level is smaller than that of the variations of the digital image are referred to hereinafter as controlled variation images. In the case of this alternative embodiment, it is preferable, according to the invention, in order to reduce the variations of the determined parameter image and to produce a regularized parameter image having a variation level smaller than that of the variations of the digital image, that the method additionally include the stage of selecting, from among the controlled variation images, a parameter image (c) (Zi.Vpi(c)) that satisfies the following conditions:

the determined parameter value (Vpij) of the determined parameter image of any zone (Zi) whatsoever is larger than or equal to the parameter value (Vpi(c)) of the selected parameter image (c), at least for several zones, the parameter value (Vpi(c)) of the selected parameter image (c) of a zone (Zi) is larger than or equal to the parameter values (Vpi(q)) for most of the controlled variation images (q) (Zi.Vpi(q)), at least for several zones.

It results from the combination of these technical features that there is obtained, in this way, a parameter image constituting the regularized parameter image.

Preferably, according to the invention, to regularize the determined parameter image as a function of the variation of the digital image, the method employs an algorithm that includes the stage of determining, for a defined zone Zi, the parameter value Vpi(n+1) of the pair (Zi.Vpi(n+1)) of the n+1-th parameter image by combining:

the parameter values Vpj (n) and/or VPj (n+1) of those pairs of the n-th image and/or of the n+1-th image whose zones Zj are situated in the vicinity of the zone Zi with corrective values that are functions of the variations of the digital image between the zone Zi and the zones Zj.

The algorithm employed by the method additionally includes the stage of iterating the preceding stage step by step.

The algorithm is initialized by applying it at first to the pairs of the determined parameter image.

Preferably, according to the invention, to modify the pixel values of a determined pixel of the digital image, the method additionally includes the following stages:

the stage of interpolating a parameter value relative to the determined pixel from parameter values of the regularized parameter image, relative to the zones adjacent to the determined pixel, the stage of modifying the determined pixel value by employing the parameter value interpolated in this way.

In the case of the alternative embodiment in which a single determined parameter value was allocated to each zone, it is preferable, according to the invention, in order to modify the pixel values of a determined pixel of the digital image, that the method additionally include the following stages:

the stage of interpolating a parameter value relative to the determined pixel from parameter values of the regularized parameter image, relative to the zones adjacent to the determined pixel, the stage of calculating a coefficient by applying a predetermined function, especially the gamma, to the parameter value interpolated in this way, the stage of multiplying the pixel values of the determined pixel by the coefficient calculated in this way.

In the case of another alternative embodiment, two determined parameter values have been allocated to each zone. These determined parameter values are referred to hereinafter as the first parameter value and the second parameter value. In the case of the alternative embodiment, it is preferable, according to the invention, in order to modify the pixel values of a determined pixel of the digital image, that the method additionally include the following stages:

the stage of interpolating a first parameter value relative to the determined pixel from the first parameter values of the regularized parameter image, relative to the zones adjacent to the determined pixel, the stage of interpolating a second parameter value relative to the determined pixel from the second parameter values of the regularized parameter image, relative to the zones adjacent to the determined pixel, the stage of choosing an affine transformation as a function of the first parameter value and the second parameter value interpolated in this way, the stage of applying the affine transformation to each of the pixel values.

Preferably, according to the invention, to modify the pixel values of a determined pixel of the digital image, the method additionally includes the following stages:

the stage of calculating a coefficient as a function of the parameter values of the regularized parameter image and of the pixel values, the stage of calculating each pixel value of the determined pixel as a function of the coefficient and of the said pixel values of the determined pixel.

Preferably, according to the invention, to modify the pixel values of a determined pixel of the digital image, the method additionally includes the following stages:

the stage of calculating a coefficient as a function of the parameter values of the regularized parameter image and of the pixel values, the stage of multiplying each pixel value of the determined pixel by the coefficient calculated in this way.

In the case of one alternative embodiment, the method is intended to increase the luminosity of the dark parts of the digital image. In the case of this alternative version, the method is additionally adapted more particularly to preserve the luminosity of those parts of the digital image that are dark and of small extent. In the case of this alternative embodiment, it is preferable, according to the invention, that the method additionally include the stage of calculating the determined parameter values of the zones of those parts that are dark and of small extent, from the determined parameter values of the adjacent zones, so that the difference between the determined parameter values for the zones in question is small.

System

The invention also relates to a system for modifying a digital image composed of pixels having pixel values. Preferably, according to the invention, the digital image is decomposed into zones $Zi$. Each of the pixels is associated with at least one adjacent zone. At least one zone value is allocated to each of the zones $Zi$. At least one parameter value $Vpij$ is allocated to each of the zones $Zi$. A set of pairs $(Zi.Vpij)$, composed of a zone $Zi$ and of a parameter value $Vpij$ associated with the zone $Zi$, constitutes a parameter image. The system includes (a) a first calculating means making it possible to determine, for each zone, determined parameter values $Vpir$, especially as a function of the zone values of the digital image. The parameter image formed in this way is referred to hereinafter as the determined parameter image.

The zone values vary between at least one of the zones and a contiguous zone. This variation is referred to hereinafter as the variation of the digital image.

The determined parameter values vary between the zone and at least one contiguous zone. This variation is referred to hereinafter as the variation of the determined parameter image.

The system additionally includes (b) a second calculating means making it possible to regularize the determined parameter image as a function of the variation of the digital image, by reducing the variations of the determined parameter image in order to produce a parameter image having a smaller variation level than that of the variations of the digital image. This parameter image is referred to hereinafter as the regularized parameter image.

The system additionally includes (c) a third calculating means making it possible to modify the pixel values of a determined pixel of the digital image as a function of the parameter values of the regularized parameter image, relative to the zones adjacent to the determined pixel.

In this way the digital image is modified differentially for each of the pixels and quasi-regularly for the contiguous zones.

Preferably, according to the invention, the method is such that each zone is composed of one pixel.

Preferably, according to the invention, the method is such that each zone is composed of a group of contiguous pixels.

Preferably, according to the invention, the determined parameter values are zone values.

Preferably, according to the invention, the zone value is the maximum value of the pixel values associated with the zone and/or the minimum value of the pixel values associated with the zone and/or a value calculated from the pixel values associated with the zone.

In the case of one alternative embodiment, a single determined parameter value has been allocated to each zone. Those parameter images whose variation level is smaller than that of the variations of the digital image are referred to hereinafter as controlled variation images. In the case of this alternative embodiment, it is preferable, according to the invention, in order to reduce the variations of the determined parameter image and to produce a regularized parameter image having a variation level smaller than that of the variations of the digital image, that the system additionally include first selecting means for selecting, from among the controlled variation images, a parameter image that is close (within the meaning of the present invention) to the determined parameter image. It results from the combination of technical features that, in this way, there is obtained a parameter image constituting the regularized parameter image.

In the case of another alternative embodiment, a single determined parameter value is also allocated to each zone. The parameter images whose variation level is smaller than that of the variations of the digital image are referred to hereinafter as controlled variation images. In the case of this other alternative embodiment, it is preferable, according to the invention, in order to reduce the variations of the determined parameter image and to produce a regularized parameter image having a variation level smaller than that of the variations of the digital image, that the system additionally include second selecting means. These second selecting means are used for selecting, from among the controlled variation images, a parameter image (c) (Zi.Vpi(c)) that satisfies the following conditions:

- the determined parameter value (Vpij) of the determined parameter image of any zone (Zi) whatsoever is smaller than or equal to the parameter value (Vpi(c)) of the selected parameter image (c), at least for several zones,
- the parameter value (Vpi(c)) of the selected parameter image (c) of a zone (Zi) is smaller than or equal to the parameter values (Vpi(q)) for most of the controlled variation images (q) (Zi.Vpi(q)), at least for several zones.

In this way, there is obtained a parameter image constituting the regularized parameter image.

In the case of another alternative embodiment, a single determined parameter value is allocated to each zone. The parameter images whose variation level is smaller than that of the variations of the digital image are referred to hereinafter as controlled variation images. In the case of this alternative embodiment, it is preferable, according to the invention, in order to reduce the variations of the determined parameter image and to produce a regularized parameter image having a variation level smaller than that of the variations of the digital image, that the system additionally include third selecting means for selecting, from among the controlled variation images, a parameter image (c) (Zi.Vpi(c)) that satisfies the following conditions:

- the determined parameter value (Vpij) of the determined parameter image of any zone (Zi) whatsoever is larger than or equal to the parameter value (Vpi(c)) of the selected parameter image (c), at least for several zones,
- the parameter value (Vpi(c)) of the selected parameter image (c) of a zone (Zi) is larger than or equal to the parameter values (Vpi(q)) for most of the controlled variation images (q) (Zi.Vpi(q)), at least for several zones.

In this way, there is obtained a parameter image constituting the regularized parameter image.

Preferably, according to the invention, to regularize the determined parameter image as a function of the variation of the digital image, the system is provided with an algorithm that includes the stage of determining, for a defined zone Zi, the parameter value Vpi(n+1) of the pair (Zi.Vpi(n+1)) of the n+1-th parameter image by combining:

- the parameter values Vpj (n) and/or Vpj (n+1) of those pairs of the n-th image and/or of the n+1-th image whose zones Zj are situated in the vicinity of the zone Zi with
- corrective values that are functions of the variations of the digital image between the zone Zi and the zones Zj.

This algorithm additionally includes the stage of iterating the preceding stage step by step. The algorithm is initialized by applying it at first to the pairs of the determined parameter image.

Preferably, according to the invention, to modify the pixel values of a determined pixel of the digital image, the third calculating means executes the following operations:

- the operation of interpolating a parameter value relative to the determined pixel from parameter values of the regularized parameter image, relative to the zones adjacent to the determined pixel,
- the operation of modifying the determined pixel value by employing the parameter value interpolated in this way.

In the case of the alternative embodiment in which a single determined parameter value was allocated to each zone, it is preferable, according to the invention, in order to modify the pixel values of a determined pixel of the digital image, that the third calculating means execute the following operations:

- the operation of interpolating a parameter value relative to the determined pixel from parameter values of the regularized parameter image, relative to the zones adjacent to the determined pixel,
- the operation of calculating a coefficient by applying a predetermined function, especially the gamma, to the parameter value interpolated in this way,
- the operation of multiplying the pixel values of the determined pixel by the coefficient calculated in this way.

In the case of another alternative embodiment, two determined parameter values have been allocated to each zone. These determined parameter values are referred to hereinafter as the first parameter value and the second parameter value. In the case of the alternative embodiment, it is preferable, according to the invention, in order to modify the pixel values of a determined pixel of the digital image, that the third calculating means execute the following operations:

- the operation consisting in interpolating a first parameter value relative to the determined pixel from the first parameter values of the regularized parameter image, relative to the zones adjacent to the determined pixel,
- the operation consisting in interpolating a second parameter value relative to the determined pixel from the second parameter values of the regularized parameter image, relative to the zones adjacent to the determined pixel,
- the operation consisting in choosing an affine transformation as a function of the first parameter value and the second parameter value interpolated in this way,
- the operation consisting in applying the affine transformation to each of the pixel values.

Preferably, according to the invention, to modify the pixel values of a determined pixel of the digital image, the third calculating means executes the following operations:

- the operation consisting in calculating a coefficient as a function of the parameter values of the regularized parameter image and of the pixel values,
- the operation consisting in calculating each pixel value of the determined pixel as a function of the coefficient and of the said pixel values of the determined pixel.

Preferably, according to the invention, to modify the pixel values of a determined pixel of the digital image, the third calculating means executes the following operations:

- the operation consisting in calculating a coefficient as a function of the parameter values of the regularized parameter image and of the pixel values,
- the operation consisting in multiplying each pixel value of the determined pixel by the coefficient calculated in this way.

In the case of one alternative embodiment, the system is intended to increase the luminosity of the dark parts of the digital image. In the case of this alternative, the system is additionally adapted more particularly to preserve the luminosity of those parts of the digital image that are dark and of small extent. In the case of this alternative embodiment, it is preferable, according to the invention, that the system additionally include a fourth calculating means for calculating the determined parameter values of the zones of those parts that are dark and of small extent, from the determined parameter values of the adjacent zones, so that the difference between the determined parameter values for the zones in question is small.

DETAILED DESCRIPTION

Figure 2:
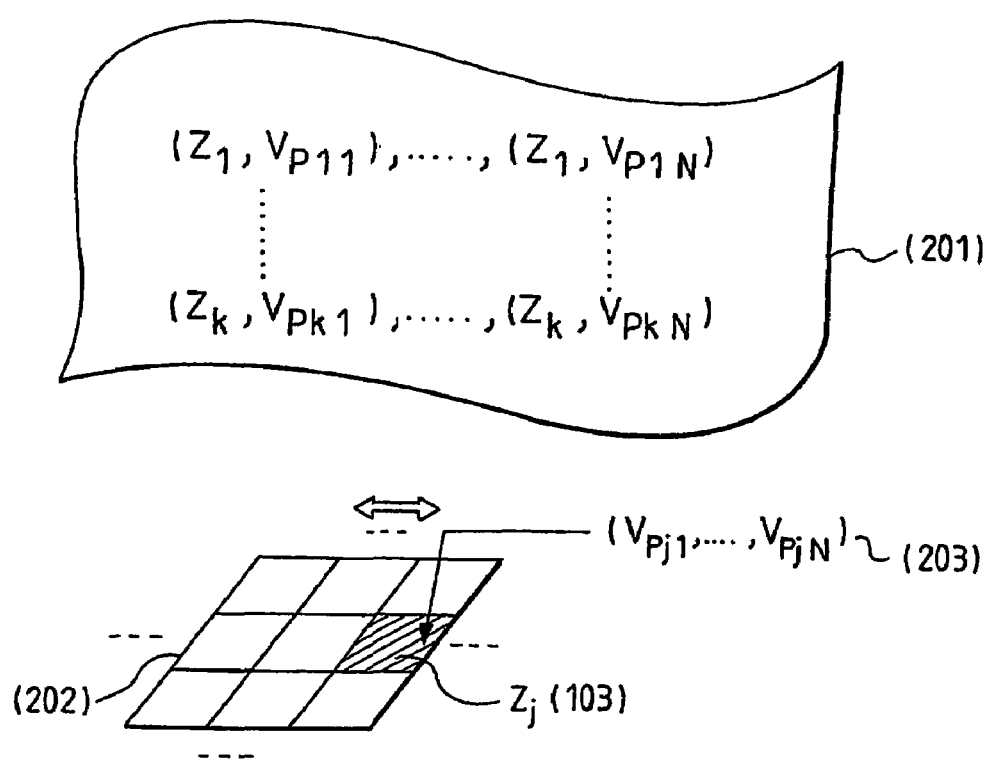
Figure 3:
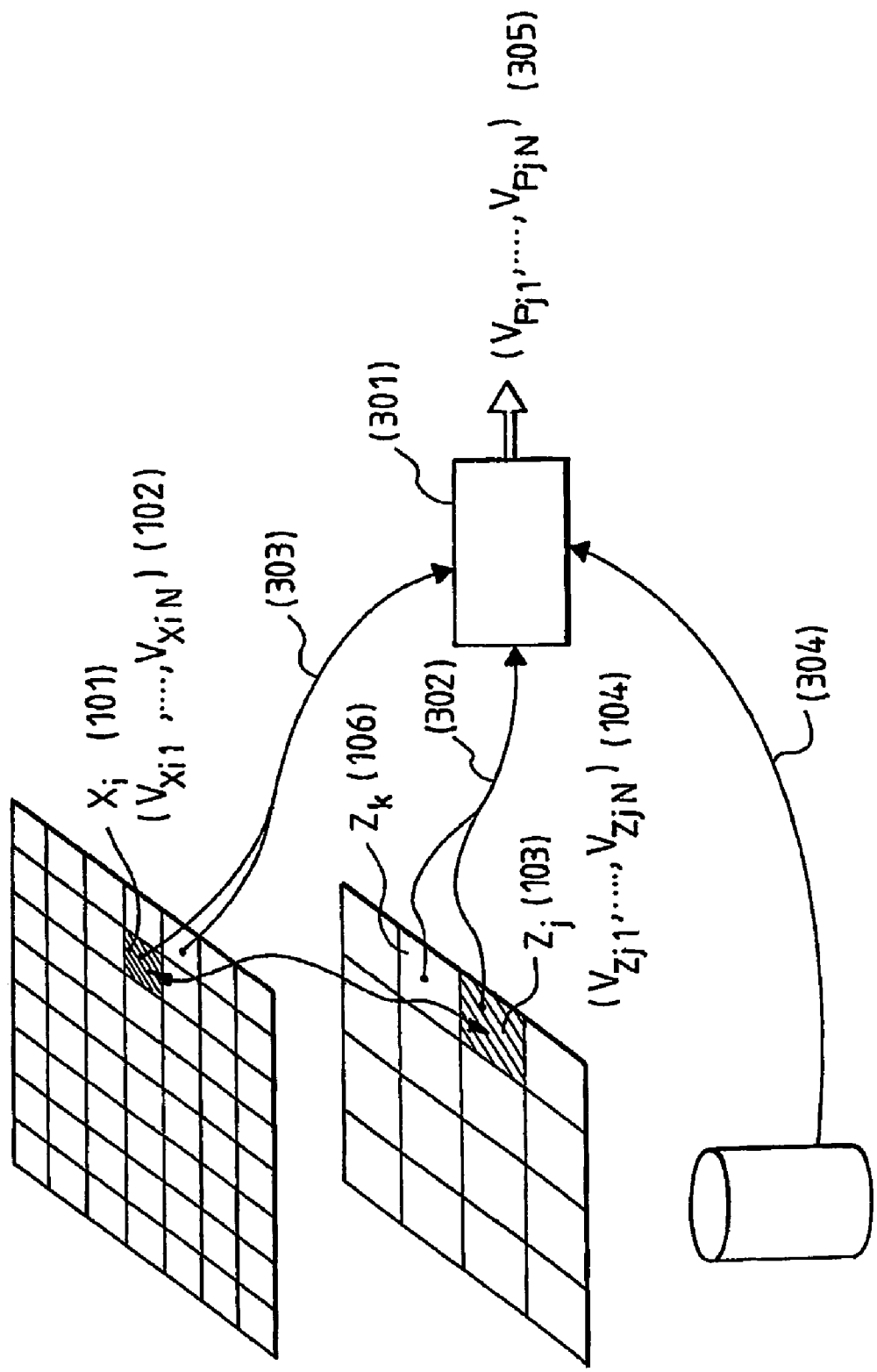
Figure 5:
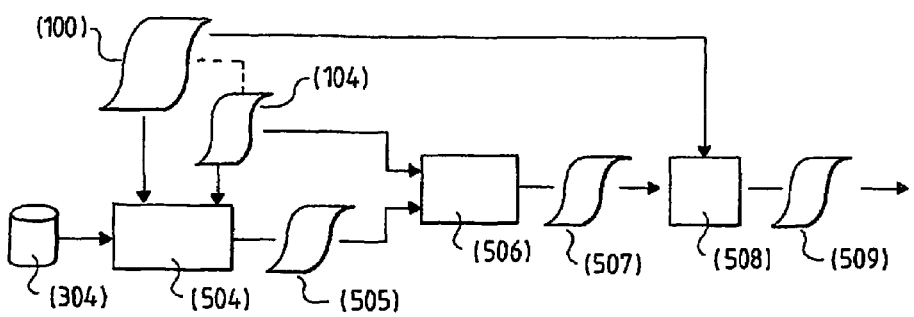

Other characteristics and advantages of the invention will become apparent from reading the description of alternative embodiments of the invention, given by way of indicative and non-limitative example, and from:

FIG. 1, which represents the digital image (100) composed of pixels (101) having pixel values (102), the digital image being decomposed into zones (103); each zone (103) having at least one zone value (104); each of the pixels (101) being associated (105) with an adjacent zone, FIG. 2, which shows, in two equivalent representations, a parameter image (201) or (202), formed from pairs, each of which is composed of a zone (103) and of a parameter value (203), FIG. 3, which represents the stage (301) of determination of the determined parameter values (305), which determination stage is employed by the first calculating means (504) illustrated in FIG. 5, FIG. 4a, which represents an example of contiguous zones (403) and the variations (401) of the digital image, FIG. 4b, which represents the variations (402) of a parameter image, and FIG. 4c, which represents the levels of variation of the digital image and of a parameter image as well as a parameter image (414) with controlled variation, FIG. 5, which represents an alternative use of the method and system, with, in particular, the determined parameter image (505) and the regularized parameter image (507). Represented in this figure are the stage (504) of determination of the determined parameter image (505) by the first calculating means (504), the stage (506) of regularization of the determined parameter image (505) into the regularized parameter image (507) by the second calculating means (506), the stage (508) of modification of the digital image (100) as a function of the regularized parameter image (507) by the third calculating means (508), FIG. 6, which represents an alternative use of the stage (508) of modification of the pixel values of the digital image (100) as a function of parameter values relative to the said pixel (603), this alternative version employing the interpolation operation (602), FIG. 7, which represents an alternative use of the stage (506) of regularization of the determined parameter image (505) into the regularized parameter image (507), this alternative version employing the selecting means (703), FIG. 8, which represents a second alternative use of the regularization stage (506) employing an iterative process, FIG. 9, which represents an alternative embodiment of the stage (504) of determination (by the first calculating means (504)) of the determined parameter image (505), this alternative version additionally employing a fourth calculating means (902), FIG. 10, which illustrates, for an alternative use of the method, the content (1001) of a digital image (100), with in particular dark parts (1002), the content (1005) of the determined parameter image (505), the content (1006) of the regularized parameter image (507) and the content (1007) digital image (509) modified differentially and quasi-regularly per pixel in accordance with the method, FIG. 11, which represents an alternative use of the stage (508) of modification of the digital image (100), which modification employs a coefficient (1104) for each pixel, FIG. 12, which represents an alternative use of the stage (508) of modification of the digital image (100), which modification employs two parameter values (1203) an affine transformation (1204) for each pixel.

Before the presented figures are described, definitions will now be given of certain concepts used in the description and claims.

Digital Image (100), Pixels (101), Pixel Values (102)

Before modes of implementation of the invention are described in more detail, it is recalled that a digital image (100) is composed of pixels (101), each pixel designating a position and a portion of the image space, each pixel having at least one pixel value (102). The images obtained from photographic apparatuses, referred to as photographic images, are two-dimensional images, in the sense that the image space is a rectangular portion of a plane. But images obtained from physical or medical observations in particular may be of higher dimensions, especially three dimensions. Similarly, a video obtained, for example, by a camcorder can be considered as a succession of two-dimensional images or as a single three-dimensional image: in this case the first two dimensions being the dimensions of the images, and the third representing the number of the image in the video.

Channels

An image can be decomposed in diverse ways into channels, containing a corresponding pixel of the image and a pixel value (102) for each of the channels.

In the particular case of color images, the decomposition into channels, which channels are then referred to as color channels, can be accomplished in particular by using a decomposition into the color spaces RGB, sRGB, LMS, Lab, Yuv, HSL, HSV, XYZ, xyz. With the exception of sRGB, these terms are defined in, for example, the following publication: "Measuring Color", Third Edition, R. W. D. Hunt, Fountain Press, Kingston-upon-Thames, England 1998, ISBN 0863433871, or in the publication "Color Appearance Models", M. Fairchild, Addison Wesley, 1998, ISBN 0201634643. The color space sRGB is defined in IEC Standard 61966-2-1, "Multimedia systems and equipment—Color measurement and management—Part 2-1: Color management—Default RGB color space & sRGB".

Within the scope of the invention, the digital image may also be composed of one or more channels concerning other data unrelated to the color, such as, for example, numerical values relative to physical variables (especially altitudes, distances, temperatures).

Luminance

In particular cases of use of the invention, more particularly adapted to modification of digitized photographic images, the concept of luminance may also be used. Luminance can be defined in numerous ways:

in the case of monochromatic images, luminance can be defined as the pixel value itself or as a value that is a function of the pixel value, in the case of color images, luminance can be defined as an arithmetic combination of pixel values. For example, luminance can be defined as the value of L in Lab color space, as the value of Y in Yuv color space, as the value of V in HSV color space, as the maximum value among the three RGB channels in RGB color space, etc.

Digital Image Portion

Within the scope of the invention, digital image portion I is defined as a digital image formed by a subset of pixels, contiguous in pairs, of digital image I. Since every digital image portion is itself a digital image, any algorithm, mathematical operator, method or system acting on any digital image whatsoever will naturally be able to act on every portion of the digital image itself.

Filter

Hereinafter reference may be made to traditional filters applied to a digital image. By filter we understand a method of modifying a digital image affecting the pixel values of each pixel as a function of the pixel values of the said pixel and of its neighbors. Here is a list of some traditional filters:
- the convolution filter, especially convolution by a positive kernel known as averaging filter,
- the median filter,
- the erosion, dilation, closing and opening filters, which are based on structuring elements or on predefined structuring functions,
- the order filters, and in particular the high-low filters,
- the monotonic nonlinear filters, in particular with nonlinear diffusions.

A precise definition of such filters can be found in particular in the following publications: "Image Analysis and Mathematical Morphology", Jean Serra, Academic Press, 1982, rev. 1988; "Image analysis: filtering and segmentation", J.-P. Cocquerez and S. Philipp, Masson 1995, ISBN 2-225-84923-4; "Anisotropic Diffusion in Image Processing", J. Weickert, ECMI Series, Teubner-Verlag, 1998, ISBN 3-519-02606-6.

Algorithm for Global Modification of a Digital Image

Hereinafter reference may be made to an algorithm (or calculating means) for global modification of the digital image. By algorithm for global modification of the digital image we denote any algorithm comprising two stages: one of global estimation and one of global modification of the digital image; the two stages being such that:
- the global estimation is achieved starting from all or part of the pixel values of the pixels of the digital image, and it generates global parameter values specific to the algorithm. The global estimation can be achieved either automatically by an algorithm or manually by a user.
- the global modification of the digital image affects the pixel values of each pixel of the digital image as a function of:
- the pixel values of the said pixel,
- the said global parameter values specific to the algorithm, and possibly
- the pixel values of pixels adjacent to the said pixel.

Examples of algorithms for global modification of digital images include the following:
- what is known as the levels algorithm, which is applied in particular to an image of a single channel, consisting in modifying the pixel values of the digital image so as to use all the dynamic possible. The global estimation stage estimates two numerical values Vm and VM, which, for example, are equal respectively to the minimum value and the maximum value of the pixel values. Vm and VM then correspond to two global parameters. The stage of modification of the digital image then proceeds as follows: the two numerical values Vm and VM define a unique affine application that transforms the first into the minimum value of the dynamic (typically 0) and the second into the maximum value of the dynamic (typically 255). The pixel values of the digital image are then modified by the affine application defined in this way.
- an algorithm for global deblurring of the image, comprising two stages:
  - a stage of estimation of a mean level of blurring of the digital image from pixel values. The algorithm then has a global parameter and a global parameter value: respectively the blurring and the mean blurring level
  - and a stage of modification of the pixel values, consisting in replacing the numerical values of each pixel by a combination of the numerical values of the adjacent pixels, the combination being determined uniquely as a function of the previously estimated global parameter value (the mean blurring level)

It is to be noted that an algorithm for global deblurring of the image can contain many parameters other than merely the mean blurring level, such as the mean noise level present in the digital image. In this case, the combination used in the stage of modification of the pixel values depends both on the mean blurring level and on the mean noise level.
- an algorithm for changing the white balance, which is applicable more particularly to a color image, including a stage of estimation of the color of the primary illuminant of the scene represented by the color image, and a stage of modification of the pixel values as a function of the primary illuminant, wherein, for example, the pixel values are changed so that the color relative to the primary illuminant attains a predetermined color. Such algorithms are advantageously used to reduce the yellowish appearance of indoor images or the bluish appearance of outdoor images taken in the shade.

The principal characteristic of an algorithm for global modification of the digital image is to modify the pixels of the digital image with the same global parameter values specific to the algorithm. As it happens, it may be advantageous to modify the pixels of the digital image with different parameter values, for example according to the position of the pixel in the image or according to the vicinity of the pixel.

To return to each of the examples mentioned hereinabove:

It may be advantageous to use the levels algorithm differently according to the part of the image in order, for example, to brighten the dark parts or to darken the bright parts, in a manner adapted to each zone of the digital image.

It may also be advantageous to use the global deblurring algorithm differently according to the part of the image, to deblur a very blurred part to a greater extent and a less blurred or very noisy part of the digital image to a lesser extent.

It may also be advantageous to use the global algorithm for changing the white balance differently, for example for images of scenes that were illuminated by different illuminants: to reduce the flash effect for the parts of the scene illuminated primarily by a flash, and to reduce the yellowish effect for the parts of the scene illuminated by a yellowish lamp, etc.

Zone (103)

Within the scope of the invention, a zone (103) can be defined in different ways or in different forms, especially:
- a pixel, or
- a subset of the image space, independent of the content of the digital image, especially a rectangular zone, for example such as rectangles or squares bounded by 3×3 or 7×7 pixels, or
- a subset of the image space determined as a function of the content of the image, for example connected pixel zones having pixel values that are similar or that fall within a range of values.

Decomposition of the Digital Image (100) Into Zones (103)

Decomposition of the digital image (100) into zones (103) can be accomplished in diverse ways according to the invention:

it can be performed as pixels, each pixel of the image defining a zone, it can be performed as a predetermined geometric partition of the image space, by grouping sets of pixels of the digital image as zones, each zone then being a set of pixels. A particular case of implementation for two-dimensional images consists in choosing a partition of the set of pixels into zones formed, for example, by X times Y pixels, it may also be performed as any geometric partition whatsoever, albeit predetermined, of the image space. A particular case of implementation for two-dimensional images then consists in performing regular subdivision of the image space, it may be performed as a partition of the image space, calculated as a function of the pixel values, especially by grouping pixels having similar values in zones. In the particular case of color images, such a partition may make it possible to group pixels corresponding to bright tones or corresponding to bright or dark parts as zones.

Adjacent Zone/Adjacent Pixel (105)

The zones (103) within the meaning of the invention correspond to subsets of the image space of the digital image (100). With each pixel (101) it will therefore be possible of course to associate one or more adjacent zones (105) among the zones (103) that contain the said pixel or are close to the position thereof. In the same way, for each zone, it naturally will be possible to consider its adjacent pixels.

Zone Value (104)

Within the scope of the invention, at least one zone value (104) is allocated to each zone (103). In the case in which the zone (103) is a pixel (101), it may also be one of the pixel values (102) of the said pixel (101) or any predetermined combination of the pixel values (102) of the said pixel (101). In the specific case of a color image, for example, the zone value may be the luminance or the value of the green color channel or the largest value among the pixel values associated with each channel.

FIG. 1 shows a digital image (100) in the special case of a 2D image. The digital image (100) is composed of pixels $xi$ (101), each pixel having pixel values (Vxi1, ..., VxiN) (102). The digital image (100) is decomposed into zones (103), at least one zone value (104) being allocated to each zone (103). Each of the pixels (101) is associated (105) with a zone (103). The two-headed arrow (105) illustrates the association between the pixel Xi and the zone Zj. In this particular case, the zone Zj is said to be the zone (105) adjacent to the pixel Xi. At (106) there is represented a set of zones (103) adjacent to the zone Zj.

Parameter Value (203)

According to the invention, at least one parameter value (203) is allocated to each zone (103). A parameter value is typically a numerical value or a datum that can be reduced to a numerical value.

Parameter

According to one alternative version of the invention, the parameter values can be attached to the concept of parameter. One possible example would be to consider two parameters and to allocate two parameter values to each zone, one relative to the first parameter and the other relative to the second parameter. This alternative version will be used very advantageously in the case in which the method or system is used in order to localize an algorithm, having at least one global parameter, for global modification of a digital image. In such a case, a parameter value relative to each of the global parameters can be allocated for each zone.

Parameter Image

Within the scope of the invention, a parameter image (201) or (202) is defined as any set of pairs formed from a zone and a parameter value.

FIG. 2 shows a parameter image (201) formed from pairs (zone Zi, parameter value Vpik allocated to the zone). The parameter image (201) of course can be represented in a manner similar to a digital image, as shown at (202): with each zone Zi (103) there are associated the parameter values (Vpi1, ..., VpiN) (203) allocated to the zone Zi (103). In the description hereinafter, a parameter image may be referenced as (201) or (202).

Determined Parameter Value (305)

Within the scope of the invention, at least one determined parameter value (305) is determined for each zone (103). A determined parameter value (305) is a particular parameter value (203).

Each determined parameter value (305) can be determined as equal to a predetermined value (or in other words, independent of the pixel values of the digital image). As an example, that may be a numerical value that becomes larger as the zone with which it is associated becomes closer to the edge of the image, thus permitting a differential modification of the pixel values between the pixels close to or far from the edge of the digital image.

Each determined parameter value (305) allocated to a zone (103) may also be determined by calculating an arithmetic combination of zone values of zones situated in a vicinity of the zone under consideration, of pixel values of pixels adjacent to the zone under consideration, of data external to the method or system.

FIG. 3 shows a practical example of the determination (301) of determined parameter values Vpj1, ..., VpjN (305) of a zone Zj (103) as a function of the zone values (104) of the zone (103) and of the zones (106) adjacent to the zone Zi (103) and/or also as a function of the pixel values (102) of pixels adjacent to the zone Zi (103) and/or of data (304) external to the method or system.

In the case in which the method or system is used in order to localize a global modification algorithm having N global parameters, to determine the determined parameter values there are provided, for example, the following stages for each zone:

the stage of global estimation of the global parameters is applied to a portion of the digital image, which portion is formed from pixels situated in the proximity of the said zone;

the values of the N global parameters determined during the preceding stage are allocated to the said zone as parameter values.

For example, in a particular case of implementation in order to localize what is known as the levels algorithm for global modification of the image, the value of the minimum level and the value of the maximum level of the zone values will be allocated to each zone as parameter values.

As another example, in a particular case of implementation localizing the global deblurring algorithm, a mean blurring level estimated from the pixel values of the pixels situated in a vicinity of the zone will be allocated to each zone as parameter value.

As a final example, the determined parameter values can be chosen as the zone values.

The system that is the object of the invention therefore provides a first calculating means (504), which will be represented in FIG. 5, making it possible to determine (301), for each zone (103), the determined parameter values (305), especially as a function of the zone values of the said digital image (104), and this for the purpose of determining the determined parameter image (505). This first calculating (504) can be referred to regardless of the alternative embodiments such as those described hereinabove.

Pair (Zi, Vpij)

For each zone Zi (103) and each parameter value Vpij (203) associated therewith, it will be possible to consider the pair (Zi, Vpij).

One or more parameter values may be associated with each zone. Advantageously, in one alternative embodiment, a fixed number P of parameters will have been chosen beforehand and, for each parameter, a parameter value said to be relative to the said parameter will be associated with each zone. Thus, for each zone Zi, it will be possible to consider the P pairs (Zi, Vpi1), ..., (Zi, VpiP). Vpi1 is the parameter value of the zone Zi relative to the first parameter. Vpi2 is the parameter value of the zone Zi relative to the second parameter, etc.

Determined Parameter Image (505)

According to the invention, the determined parameter image (505) is a parameter image (202) in which the pairs are formed from a zone (103) and from one or more determined parameter value(s) (305) for this zone (103).

According to the invention, one or more determined parameter image(s) can be composed.

In one alternative embodiment in which the parameter values are relative to a pre-established choice of P parameters numbered from 1 to P, it will be possible to consider several determined parameter images, especially one for each parameter, each determined parameter image being composed of the subset of pairs formed with the parameter values relative to one of the parameters, the j-th determined parameter image therefore being composed of the pairs (Z0, Vp0j), ..., (ZN, VpNj), for example. In this way, it will be possible to consider only a single parameter image, then composed of P planes or channels, the pairs of the j-th plane or channel being the pairs (Z0, Vp0j), ..., (ZN, VpNj).

Since the determined parameter image (505) is a parameter image, either one of the parameter image representations (201) or (202) or any other alternative parameter image representations naturally are applicable to the determined parameter image (505).

Variation of Zone Values

Since the zone values (104) are numerical values, the variation between two zone values (103) naturally can be defined as a mathematical distance between these two numerical values.

In the particular case in which a single zone value (104) is allocated to each zone (103), the variation between two zones (103) may be, for example, the amplitude of the difference between the zone values of the two zones. More generally, any function of this difference may be used as a definition of the variation.

When several zone values are allocated to each zone, it will be possible to define the variation between two zones as, for example:

a single numerical value, such as in particular the sum of the amplitudes of the differences between the zone values of the two zones, or the greatest difference among the differences between the zone values of the two zones, a vector formed from several numerical values, such as in particular the vector formed from each difference or amplitude of difference between the zone values of the two zones.

Variation (401) of the Digital Image

Within the scope of the invention, the variation (401) of the digital image refers to all or part of the set of variations between contiguous zones (403) of the digital image (100).

Within the meaning of the invention, two zones (403) are said to be contiguous if they correspond to two subsets of the digital image that are joined to one another. More generally, it can be considered that two zones are contiguous if a mathematical distance between the two corresponding subsets of the digital image is smaller than a determined threshold.

FIG. 4a illustrates the variation (401) of the digital image for an alternative implementation of the method or system in the case of a one-dimensional digital image (100) and in the case in which a single zone value (104) is allocated to each zone (103). The image space and the zones (103) of the digital image (100) are represented horizontally. The zone values (104) are represented vertically. Zi and Zk represent an example of two contiguous zones (403). The arrows relative to the variation between zone values of contiguous zones (403) represent the variation (401) of the digital image.

Variation of the Parameter Values

Since the parameter values (203) are numerical values or values that can be reduced to numerical values, the variation between two parameter values naturally can be defined as a mathematical distance between the numerical values.

In the particular case in which a single parameter value is allocated to each zone, the variation between two contiguous zones may be, for example, the amplitude of the difference between the parameter values of the two zones. More generally, any function of the said difference may be used as a definition of the variation.

FIG. 4.b illustrates the variation of the determined parameter image (505) for an alternative implementation of the method or system in the case of a one-dimensional digital image (100) and in the case in which a single determined parameter value (305) is allocated to each zone (103). The image space and the zones (103) of the digital image (100) are represented horizontally. The determined parameter values (305) are represented vertically. The arrows illustrate the variation (402) of the determined parameter image.

When several parameter values are allocated to each zone, it will be possible for example to define the variation of the parameter values between the two zones the sum of the amplitudes of the differences between the parameter values of the two zones.

In the particular case in which the parameter values are relative to the parameters, it will be possible to define the variation of the parameter values as a function relative to the differences between parameter values relative to a given parameter, so that only parameter values of one and the same type are compared.

In the particular case in which the method or system is used in order to localize an algorithm, having at least one parameter, for global modification of the digital image, it will be possible to define the variation of the parameter values as a function relative to the difference in effect that they generate during global modification of the digital image. For example, in the particular case of what is known as the levels algorithm, and for parameter values associated respectively with the minimum level parameter and the maximum level parameter, it will be possible to define the variation of parameters between two zones as the absolute value of the difference of the mean of these two parameter values between the two zones.

Variation (402) of a Parameter Image and in Particular of the Determined Parameter Image Within the scope of the invention, the variation (402) of a parameter image, and in particular of the determined parameter image, makes reference to all or part of the set of variations of parameter values (203) (or (305)) between contiguous zones (403).

Variation Level

Within the scope of the invention, we compare the variation (401) of the digital image with that (402) of a parameter image. As it happens, according to alternative versions of the invention, the variations of the digital image and the variations of the parameter image might be expressed in different units. In order to be able to compare these two types of variations, we make reference to a variation level associated with each of the two types of variation.

The variation level of a digital image or of a determined parameter image may be the variation itself, its amplitude or, more generally, a function of the variation that permits comparison between the two types of variation levels.

Smaller Variation Level

The variation level of a parameter image will be said to be smaller than the variation level of the digital image if, for example:

for each pair of contiguous zones, the variation level of the parameter image between the two zones is smaller than the variation level of the digital image between the two zones;

for a majority or a predefined percentage of pairs of contiguous zones, the variation level of the parameter image between the two zones is smaller than the variation level of the digital image between the two zones;

the mean of the variation levels of the parameter image is smaller than the mean of the variation levels of the digital image.

More generally, since the variation level of the parameter image forms a set formed from numerical values and the variation level of the digital image forms a like set formed from other numerical values, the comparison between the variation levels of the parameter image and the digital image can be defined on the basis of any relationship of mathematical nature applicable to these sets.

FIG. 4c shows an example of the variation of a digital image for an alternative implementation of the method or system in the case of a one-dimensional digital image (100) and in the case in which a single zone value (104) is allocated to each zone (103). The image space is represented horizontally, where part of the zones (103) of the digital image (100) are represented in the form of grid elements. The zone values (104) are noted inside the grid element (411). An example of the variation (401) of the digital image is shown in (412) in the form of numerical values equal to the amplitude between the zone values of contiguous zones. The variation level of the digital image is shown in (413) and, in this particular case, it is calculated for each pair of contiguous zones as the value 5 plus half of the value of the variation between the contiguous zones. A parameter image is shown in (414). The variation of the parameter image is shown in (415) and the variation level is shown in (416). In this particular case, the variation level of a parameter image has been chosen to be equal to its variation. For each pair of contiguous zones, the variation level of the parameter image is smaller than the variation level of the digital image. The variation level (416) of the parameter image is smaller than the variation level (413) of the digital image.

Regularized Parameter Image (507)

Within the scope of the invention, the regularized parameter image (507) is a parameter image (201) exhibiting a variation level (416) that is smaller than the variation level (413) of the digital image.

Regularized Parameter Value

Within the scope of the invention, every parameter value of the regularized image will be referred to as a regularized parameter value. In the same way as in an alternative embodiment of the invention, each parameter value can be relative to a parameter, and each of the regularized parameter values can also be relative to a parameter.

General Method and/or System

FIG. 5 illustrates a practical example of the method and system that are the object of the invention. Starting from the digital image (100), from zone values (104) and possibly from data (304) external to the method or system, a determined parameter image (505) is determined with a first calculating means (504). With a second calculating means (506), the determined parameter image (505) is regularized into a regularized parameter image (507). With a third calculating means (508), the digital image (100) is then modified (508) as a function of the regularized parameter image (507), thus to obtain a modified digital image (509), in which the modifications are differentiated and quasi-regular per pixel.

In the description hereinafter, in order to simplify the text while avoiding repetitions, we will use, as synonyms, the "stage of determination" of the determined parameter image and the first calculating means (504) with which this stage of determination can be executed. Similarly, we will also use, as synonyms, the "stage of regularization" of the determined parameter image into the regularized parameter image and the second calculating means (506) with which this stage of regularization can be executed. Finally, we will use, as synonyms, the "stage of modification" of the digital image and the third calculating means (508) with which this stage of modification can be executed.

The regularized parameter image (507) is constructed from the determined parameter image (505) by a regularization stage (506) that has the effect of reducing the variations (402) of the determined parameter image (505) for all or part of the contiguous zones (403) in which these variations are larger than the variations (401) of the digital image (100) between these zones. Several uses of the regularization stage (506) will be presented hereinafter.

Modification Stage (508)

According to the invention, the pixel values of the pixels of the digital image are modified (508) as a function of the parameter values of the regularized parameter image (507), which parameter values are relative to the zones adjacent to the said pixel.

According to an alternative use, more particularly adapted to localization of a global modification algorithm having at least one global parameter, the pixel values will be advantageously modified by applying, for each pixel, the global modification stage of the algorithm for global modification of the digital image to the said pixel, the parameter values for each global parameter being, for example:

the regularized parameter value, relative to the said global parameter, of a zone adjacent to the said pixel a predetermined combination of regularized parameter values, relative to the said global parameter of at least one zone adjacent to the said pixel and to other zones, such as, for example, all or part of the zones contiguous with a zone adjacent to the said pixel.

Since these values may vary from one pixel to another, albeit in controlled manner, there is then obtained a modification of the digital image that is no longer global but is a modification that is differentiated and quasi-regular per pixel.

Alternative Modification Stage (Local Parameter Value)

In an alternative version of the invention, there will be calculated, for each pixel (101) of the digital image (100), one or more parameter value(s) relative to the said pixel (603), from parameter values (203) of the said regularized parameter image (507), relative to the zones (105) adjacent to the said determined pixel. Hereinafter we will designate as local parameter value (603) any parameter value relative to a pixel (603).

Figure 6:
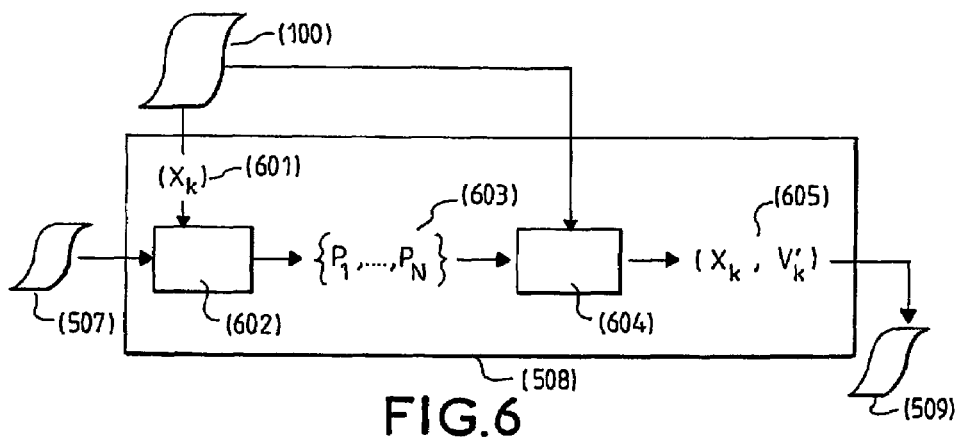

FIG. 6 illustrates such an alternative embodiment: it concerns a particular use of the stage of modification of the digital image, or third calculating means (508). For each pixel xk (101) of the digital image (100), there are calculated the N parameter values relative to the pixel xk (101) (local parameter values) (P1, . . . , Pn) (603) from parameter values of the regularized parameter image (507), relative to the zones adjacent to the pixel xk (101). The value Vk of the pixel xk of the digital image is then modified to a modified value V'k (605), by employing an operation (604), which is a function in particular of the local parameter values (P1, . . . , Pn) (603). Once each pixel of the digital image has been treated, there is then obtained the modified digital image (509).

The operation (602) of calculating or interpolating the local parameter values for each pixel can be achieved in different ways, depending in particular on the choice of zones of the digital image.

For example, in the case in which each pixel defines a zone, the local parameter values of each pixel may be the regularized parameter values of the associated local zone.

As another example, in the case in which the zones form a regular partition of the digital image, the local parameter values for a determined pixel may be interpolated from parameter values of the said regularized parameter image, relative to the zones adjacent to the said determined pixel. In the particular case in which the zones form a regular partition by grouping the pixels into a rectangle (such as 3×3 for a two-dimensional image), the interpolation may be achieved as a zoom of the regularized parameter image: it will be possible to choose an interpolation of bilinear type (for each pixel, the parameter values of four adjacent zones will be employed for a two-dimensional image, and eight zones for a three-dimensional image). It will also be possible to choose an interpolation of the bi-cubic type, which will employ 16 adjacent zones in the case of a two-dimensional image. More generally, it will be possible to use any type of zoom or interpolation. In the case in which the method or system is used in order to localize a global modification algorithm having at least one global parameter, the operation (604) of modification of the digital image can be effected as follows:

for each pixel, we determine, for each global parameter, a local parameter value as described previously.

The pixel values of the said pixel are modified by applying the global modification stage of the algorithm for global modification of the digital image, with the local parameter values calculated in the preceding stage as global parameter values.

Since these values may vary from one pixel to another, albeit in controlled manner, there is then obtained a modification of the digital image that is no longer global but is a modification that is differential and quasi-regular per pixel. This case is illustrated by FIG. 6, the modification operation (604) using explicitly the global modification algorithm.

Regularization Stage (506)

We will now describe different alternative embodiments of the regularization stage, or the second calculating means (506) for achieving regularization.

Concept of Partial Order Over the Parameter Images

In one alternative embodiment of the invention, one may be led to compare the order (lower or higher) between two parameter images. Since the parameter images are formed from pairs (zone, parameter value) and each of the parameter values is a numerical value or can be reduced to a numerical value, the order between two parameter images can be defined on the basis of any mathematical relationship of partial order applicable to such sets of pairs.

In the case in which a single parameter value is not allocated to each zone, a parameter image IP1 will be said to be larger than a parameter image IP2 if, for example:

for a predetermined zone Zi, the parameter value Vpi(IP1) is larger than Vpi(IP2);

for a majority of zone Zi, the parameter value Vpi(IP1) is larger than Vpi(IP2);

for all zones Zi, the parameter value Vpi(IP1) is larger than Vpi(IP2);

the mean value of the parameter values in IP1 is larger than the mean value of the parameter values in IP2, etc.

Controlled Variation Image (414)

In one embodiment of the invention, a controlled variation image (414) is defined as any parameter image (201) whose variation level is smaller than the variation level of the digital image. The regularized parameter image (507) is therefore a particular case of controlled variation image (414). Thus, to regularize the determined parameter image (505), there advantageously can be selected, from among the controlled variation images (414), a parameter image (201) similar to the determined parameter image (505). FIG. 4.*c* shows an example of a controlled variation image (414) in the particular case (411) of the digital image (100).

Controlled Variation Image Close to the Predetermined Parameter Image

The concept of proximity can be defined according to a metric or mathematical distance over the space of the parameter images. For example, the distance between two parameter images can be chosen as the sum of the quadratic differences between the parameter values, two parameter images then being closer than two others if the distance between the first two is smaller than the distance between the last two.

The concept of proximity can also be defined according to criteria that are not necessarily relative to a mathematical distance, the object of selection being to choose a controlled variation image that is relative to the determined parameter image. For example, it will be possible to select the controlled variation image which is the smallest and whose parameter values for all, for almost all or for a majority of the zones are greater than or equal to the parameter values of the determined parameter image. In this example, the concept of "close" has a more general sense than a concept relative to a mathematical distance.

Regularization by Selection (703)

In certain cases of choosing the definition of variation level of the digital image and of the parameter image, it can be relatively easy to represent the set or a subset (702) of controlled variation images (414) formally or numerically. In this case, an advantageous alternative version of the regularization stage or calculating means (506) invention consists in selecting, by virtue of selecting means (703), the controlled variation image, among this set, closest to the determined parameter image (505).

We cite, for example, the case in which the variation level of the digital image between two zones is defined as a constant C, independently of the zone values, and in which the variation level between two zones of a parameter image is the amplitude of the difference of the parameter values. The set of controlled variation images can be represented as a set of Lipschitz functions, with a Lipschitz constant equal to the constant C. For such a set and for any metric over the function space, there exists a mathematical projection P that associates, with each function, that function which is closest within the sense of the metric. Such a projection can be numerically implemented, and it will associate, with each parameter image, the parameter image with controlled variation that is closest in the sense of the chosen metric.

Similarly, according to another alternative version, it will be possible to select the Lipschitz function of constant C which is smallest from among those that are larger than the determined parameter image. This function is known mathematically as the upper Lipschitz extension, associated with the determined parameter image. Similarly, it will be possible to select the Lipschitz function of constant C which is largest from among those that are smaller than the determined parameter image. What is then selected is the lower Lipschitz extension. As in the foregoing, within the meaning of the invention, it will be possible to consider that the concepts of larger (or respectively smaller) between two parameter images means that the zone values of the first parameter image are larger (respectively smaller) than the zone values of the second parameter image for all, for almost all, for a majority, for most or for several zones. In this way, we select a regularized parameter image that satisfies the following conditions:

the determined parameter value (Vpij) of the determined parameter image of any zone (Zi) whatsoever is smaller than or equal to the said parameter value (Vpi(c)) of the selected parameter image (c), at least for several zones, the parameter value (Vpi(c)) of the selected parameter image (c) of a zone (Zi) is smaller than or equal to the parameter values (Vpi(q)) for most of the controlled variation images (q) (Zi; Vpi(q)), at least for several zones.

Figure 7:
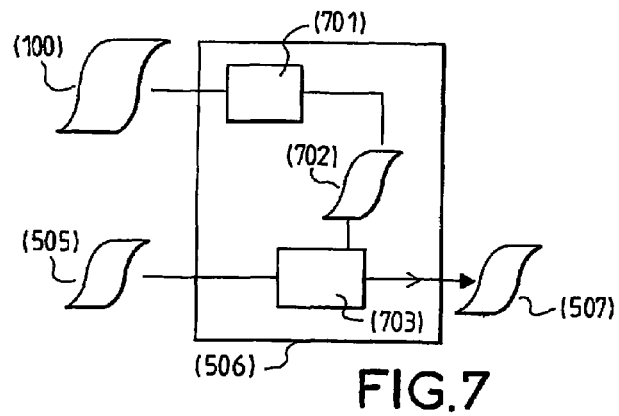

FIG. 7 illustrates one use of the regularization stage or second calculating means (506) via a selection stage or selecting means (703) as described in the foregoing. In this figure, the same element (703) represents the different embodiments of the selecting means. Starting from the digital image and the zone values (100), there are established (701) the formal or numerical data (702) relative to the set or a subset of parameter images (702) with controlled variation, on the basis of which the selecting means (703) select the controlled variation image (507) closest to the determined parameter image (505).

Regularization by Filtering

In one alternative embodiment of the invention, the stage (506) of regularization of the determined parameter image into the regularized parameter image can be effected by virtue of a calculating means (506) based on a regularizing filter. We will give an example in the case in which a single parameter value is allocated to each zone. (The case in which several parameter values are allocated to each zone can be treated in the same way). We also will assume that the parameter values are numerical values, and that the determined parameter image can be considered as a digital image, the zones serving as pixels and the parameter values serving as pixel values.

Within the scope of the invention, we define as regularizing filter: any filter that modifies a digital image into a digital one having a smaller mean variation than the initial digital image.

Classical examples of regularizing filters are: convolutions by a positive kernel such as the averaging filter, the order filters such as the median, closing and opening filters, the diffusion filters such as the isotropic or anisotropic diffusion filters, etc.

Figure 8:
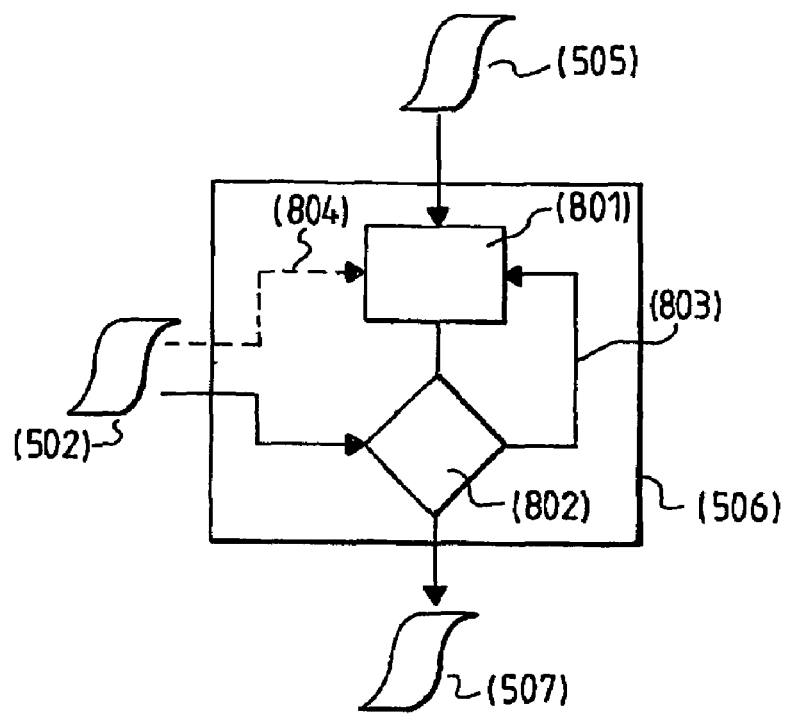

FIG. 8 illustrates an alternative use of the regularization stage or second calculating means (506). The calculating means (506) employs a regularizing filter (801). This regularizing filter is applied iteratively, an n+1-th parameter image thus being constructed by application of the filter to an n-th parameter image (803), the process being initialized with the determined parameter image (505). The process can be iterated (802) until an m-th parameter image exhibits a variation level smaller than or equal to the variation level of the digital image, the m-th parameter image calculated in this way being able to be chosen as the regularized parameter image (507). However, because of calculating time concerns, it may be advantageous to choose a quantitative stop criterion (802): as for example, iterating a fixed number of times or until the n+1-th image exhibits only little modification in parameter values compared with the n-th image.

It is to be noted that, in order to calculate the n+1-th image, the filter will not necessarily be applied to all zones of the n-th parameter image. In particular, it may be applied only to the zones for which the n-th parameter image exhibits a larger variation level than the variation level of the digital image. For example, if the filtering parameter of the filter is a force F making it possible to regulate the degree of modification of the pixel values of a digital image, the pixel values are not modified when F is equal to 0, and the pixel values normally are modified when F is equal to 1. As an example, the filter force advantageously can be used as follows: the filter (801) is applied to an n-th parameter image (803) with a force F that, in the zone under consideration, is larger when the variation level of the n-th parameter image (803) is greater the variation level of the digital image, this latter variation level being symbolized in FIG. 8 by (804). The use of the force F then serves as a corrective value.

Corrective Value

An alternative implementation of the regularization stage (506) can also be accomplished by using, in each zone and its neighbors, explicitly a corrective value that is a function of the variations of the digital image between the said zones. We shall assume that a single parameter value is allocated to each zone, the most general case naturally being deduced from this particular case. The regularized parameter image is obtained iteratively, an n+1-th parameter image being constructed from an n-th parameter image, the process being initialized with the determined parameter image.

In each iteration there is successively determined, for all zones, the parameter value Vpi(n+1) of a zone Zi of the n+1-th parameter image by combining, according to a combination formula:

the parameter values Vpk(n) of the n-th image whose zones Zk are situated in a vicinity of the zone Zi and/or the parameter values Vpk(n+1) of the n+1-th image whose zones Zk are situated in a vicinity of the zone Zi and for which the parameter values Vpk(n+1) have already been calculated beforehand;

corrective values that are a function of the variations of the digital image between the zones Zk and Zi.

As in the foregoing, the iterations will be stopped at an m-th parameter image, if the m-th parameter image constructed in this way exhibits, within the meaning of the invention, a variation level smaller than the variation level of the digital image, or if a predefined quantitative criterion is met.

Regular Extension of the Determined Parameter Image

The foregoing process can be used with different combination formulas making it possible to calculate the parameter value Vpi(n+1) of a zone Zi of the n+1-th parameter image.

In particular, Vpi(n+1) can be calculated by:

calculating, for each of the zones Zk contiguous with the zone Zi, a candidate value Wk obtained by subtracting, from Vpk(n), a corrective value equal to a function f of the variation of the digital image between the zones Zk and Zi, and then choosing the largest value among the values Wk calculated in this way and the parameter value Vpi(n).

In this way there is obtained an upper regular explicit extension of the determined parameter image. In fact, it will be possible for the person skilled in the art to prove that there exists at least one value m such that the m-th parameter image constructed by the process has the following properties:

for all zones, the parameter values of the m-th image are larger than the parameter values of the determined parameter image, and so in this sense the m-th image is larger than or equal to the determined parameter image, for all pairs of contiguous zones, the variation between the two zones of the pair of the m-th image is smaller than the function f of the variation of the digital image between the two zones, in this sense making the variation level of the m-th parameter image smaller than the variation level of the digital image.

calculating, for each of the zones Zk contiguous with the zone Zi, a candidate value Wk obtained by adding, to Vpk(n), a corrective value equal to a function f of the variation of the digital image between the zones Zk and Zi, and then choosing the smallest value among the values Wk calculated in this way and the parameter value Vpi (n). In this way there is obtained a lower regular explicit extension of the determined parameter image. By analogy with the foregoing, there exists at least one value m for which the m-th parameter image constructed in this way is smaller than or equal to the determined parameter image and exhibits a smaller variation level than the variation level of the digital image.

In the case in which the zones form a regular mesh structure of a portion of a plane, as for example, if the zones are the pixels of a two-dimensional digital image, it will be possible advantageously to implement the process in a particular way:

an n+1-th parameter image being constructed from an n-th parameter image by calculating the values Vpi(n+1) of the zones Zi successively, for example from top to bottom and from left to right if n is even, and from bottom to top and from right to left if n is odd, by using one of the following two combination formulas:

the value Vpi(n+1) is determined by calculating, for each of the zones Zk contiguous with the zone Zi for which the value Vpk(n+1) is already calculated, a candidate value Wk obtained by subtracting, from Vpk(n+1), a corrective value equal to a function f of the variation of the digital image between the zones Zk and Zi and then choosing the largest value among the values Wk calculated in this way and the parameter value of Vpi(n);

the value Vpi(n+1) is determined by calculating, for each of the zones Zk contiguous with the zone Zi for which the value Vpk(n+1) is already calculated, a candidate value Wk obtained by adding, to Vpk(n+1), a corrective value equal to a function f of the variation of the digital image between the zones Zk and Zi and then choosing the smallest value among the values Wk calculated in this way and the parameter value Vpi(n).

In algebraic notation, the calculation of the value Vpi(n+1) for each zone Zi can be transcribed as follows. (We define Var(i,k) as the variation of the digital image (100) between the zones Zi and Zk. For example, this variation can be quite simply the difference of the zone values. We also assume in the example that there are K zones adjacent to the zones Zi)

Case of the first combination formula:

For each k such that the zone Zk is adjacent to the zone Zi:

If Vpk(n+1) already calculated:

$$Wk = Vpk(n+1) + f(Var(i,k))$$

otherwise $$Wk = Vpk(n) + f(Var(i,k))$$

$$Vpi(n+1) = MAX(Vpi(n), W1, \ldots, WK)$$

Case of the second combination formula:

For each k such that the zone Zk is adjacent to the zone Zi:

If Vpk(n+1) already calculated:

$$Wk = Vpk(n+1) - f(Var(i,k))$$

otherwise $$Wk = Vpk(n) - f(Var(i,k))$$

$$Vpi(n+1) = MIN(Vpi(n), W1, \ldots, WK)$$

Once the criterion for stopping the iterations has been satisfied, there is obtained an upper regular implicit extension of the determined parameter image in the first case and a lower regular implicit extension of the determined parameter image. Empirically, the number of iterations necessary to reach a stop criterion for this alternative version, which is said to be "implicit", is definitely smaller than for the construction of regular explicit extensions of the determined parameter image.

Localization of Gamma Function

We now describe an alternative embodiment of the invention referred to here as the local gamma version, more particularly adapted to changing the luminance of a photographic digital image locally and quasi-regularly. As the zone value (104) for each zone (103), it will be advantageous to choose, for example, the mean luminance of the pixels (101) associated (105) with the zone (103). In the case of an RGB color image, the luminance of a pixel can be defined as the largest value among the pixel values of the pixel. For each zone (103), there is allocated a determined parameter value (305), which can be, for example, the zone value (104) itself.

The local gamma version provides an additional stage (902) of modification of the determined parameter image, or a fourth calculating means (902). For example, the parameter values of a zone of the determined parameter image can be modified according to whether or not the zone is situated in a part of the digital image that is dark and of small extent, thus achieving a modification of the digital image differentially in these parts.

Figure 9:
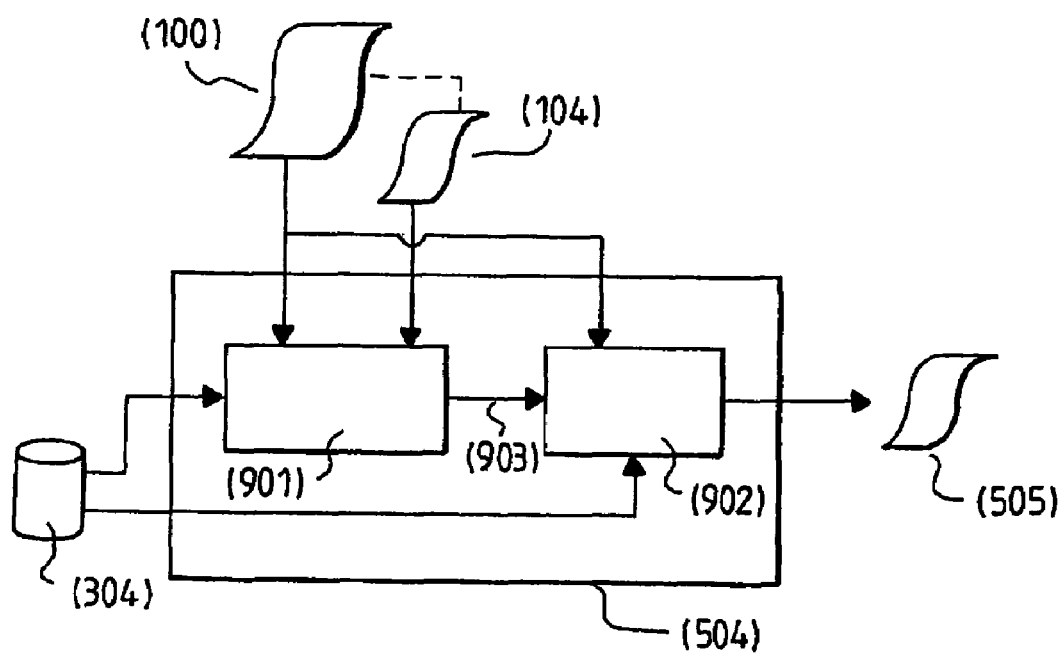

FIG. 9 illustrates this alternative use of the stage (504) of determination of the determined parameter image (505) in the case of the local gamma version. Starting from the digital image (100), from the zone values (104) and possibly from data (304) external to the method or system (user preference), there is determined (901) a first determined parameter image (903). This first determined parameter image (903) is then modified by employing a calculating means (902), parameterized by data external to the method or system and data relative to the image (image size, zone size, etc.), in order to obtain the determined parameter image (505). In this figure, the same element (902) represents the different embodiments of the calculating means.

Before giving examples of modification (902) of the determined parameter image, we describe a practical example of the method or system particularly adapted to the local gamma version:

To obtain the regularized parameter image (507), the second calculating means (506) (or regularization stage) will be able to construct a regular implicit extension of the determined parameter image (505) by choosing, for example, an affine function of slope less than or equal to 1 as the function f determining the corrective values.

The pixel values (102) will then be modified (by the third calculating means or modification stage (508)) for each pixel:

- by interpolating a local parameter value (603) by, for example, calculating the local value as an arithmetic combination of the parameter values of the regularized parameter image that correspond to the zones adjacent to the pixel;
- by calculating a coefficient c by, for example, applying a predetermined function such as what is known as the gamma function to the local parameter value (603). In order to enhance the luminance more for the low luminance values, it will be preferable to choose a function having a negative slope, at least beyond a given luminance. For parameter values ranging from 0 to 255, it will be possible, for example, to take the function that has a value x greater than or equal to 1 and associates the value 255*((x/255) to the power gamma) for gamma between −1 and 0, and that associates the value 0 for a value x equal to 0;
- and finally by multiplying the pixel values (for example, the pixel values corresponding to the RGB color plane in the case of a color image) by the coefficient c calculated in this way.

Such a use of the stages of regularization (506) and correction (508) induces an augmentation of the pixel values (and in particular of the luminance) of a pixel that is more pronounced the smaller is the associated regularized parameter value.

This alternative use of the modification stage or third calculating means (508) is illustrated in FIG. 11. For each pixel xk of the digital image (100), there are executed the following operations:

- the operation (1100) of interpolating the local parameter value (603),
- the operation (1101) of calculating the coefficient (c) (1104) from the local parameter (603) and by means of a predetermined function (1103),
- the operation (1102) of multiplying the pixel values (102) by the coefficient c (1104).

Shadows or Dark Part (1002)

We now present an example of the stage (902) of modification of the determined parameter image (505) that is intended to brighten the poorly illuminated or exposed parts of the digital image without introducing artifacts into the resulting image:

For that purpose, the modification stage (902) (using the calculating means (902)) seeks to modify the determined parameter image (505) so that the parameter value (203) of a zone (103) is linked as much as possible to the quantity of light received by the pixels (101) associated (105) with the zone (103). The parameter value will be conserved when the zone corresponds to a shaded or poorly illuminated part, in order to maintain the augmentation of luminance for the pixels associated with the zone. And the parameter value will be augmented when the zone corresponds to a well illuminated part, in order to reduce the augmentation of luminance for the pixels associated with the zone. For that purpose, we consider that, in general, the parts of the digital image that have large size and are composed of dark zones are the poorly illuminated parts known as "dark parts" (1002) and those of small size are parts that are naturally dark but are normally illuminated. The concept of large or small size can be defined as relative to a number of zones respectively below or above a determined threshold and in particular is a function of the number of pixels of the digital image. The determined parameter image (505) can then be modified (902) as follows:

One can proceed in explicit manner. The dark parts (1002) are identified as being sets of contiguous zones for which the zone value is below a threshold and for which every contiguous zone has a zone value above the threshold. For each zone of a part that is dark and of small size, new values of determined parameters are then calculated from determined parameter values of zones adjacent to the said part by, for example, replacing all the determined parameter values of the zones of the part by an arithmetic combination (mean, minimum value, interpolation, etc.) of the determined parameter values of the zones contiguous with the said part.

It is also possible to proceed in implicit manner, that is, without pre-detection of "small" dark parts, by applying a filter "removing" the small dark parts. Such a filter can be a simple closing filter that uses a structuring element linked to the size that defines the concept of "small" part. For example, the structuring element may be a geometric shape (disk, square, etc.) grouping together a determined number of zones.

In general, the determined parameter image (505) obtained by means of one alternative version or the other will then exhibit large variations in zones where the digital image does not have any. The regularization stage (506) applied to the determined parameter image (505) such as described hereinabove is then indispensable for ensuring that halo or edge phenomena do not appear in the resulting digital image.

Other examples of modifications (902) of the determined parameter image can be:

- the determined parameter image can be modified by means of a filter, especially via a closing filter or an averaging filter. That makes it possible to proceed so that the pixel values are modified as a function of the luminance characteristics of the pixels situated in their vicinity and not as a function of their own luminance;
- the determined parameter image can be modified by reducing or augmenting the parameter values of certain zones, and this in order to take into account predefined preferences for modification of the luminance. This alternative version can be particularly adapted to use of the method or system in the scope of interactive image-processing software. For example, if a user wishes to augment the luminance over part of the image that he will crop roughly by hand, he will diminish the parameter values for the zones situated in the roughly cropped part. There again, the regularization stage applied to the determined parameter image such as described hereinabove is then indispensable for ensuring that edge phenomena do not appear, especially at the border of the cropped part.

Figure 10:
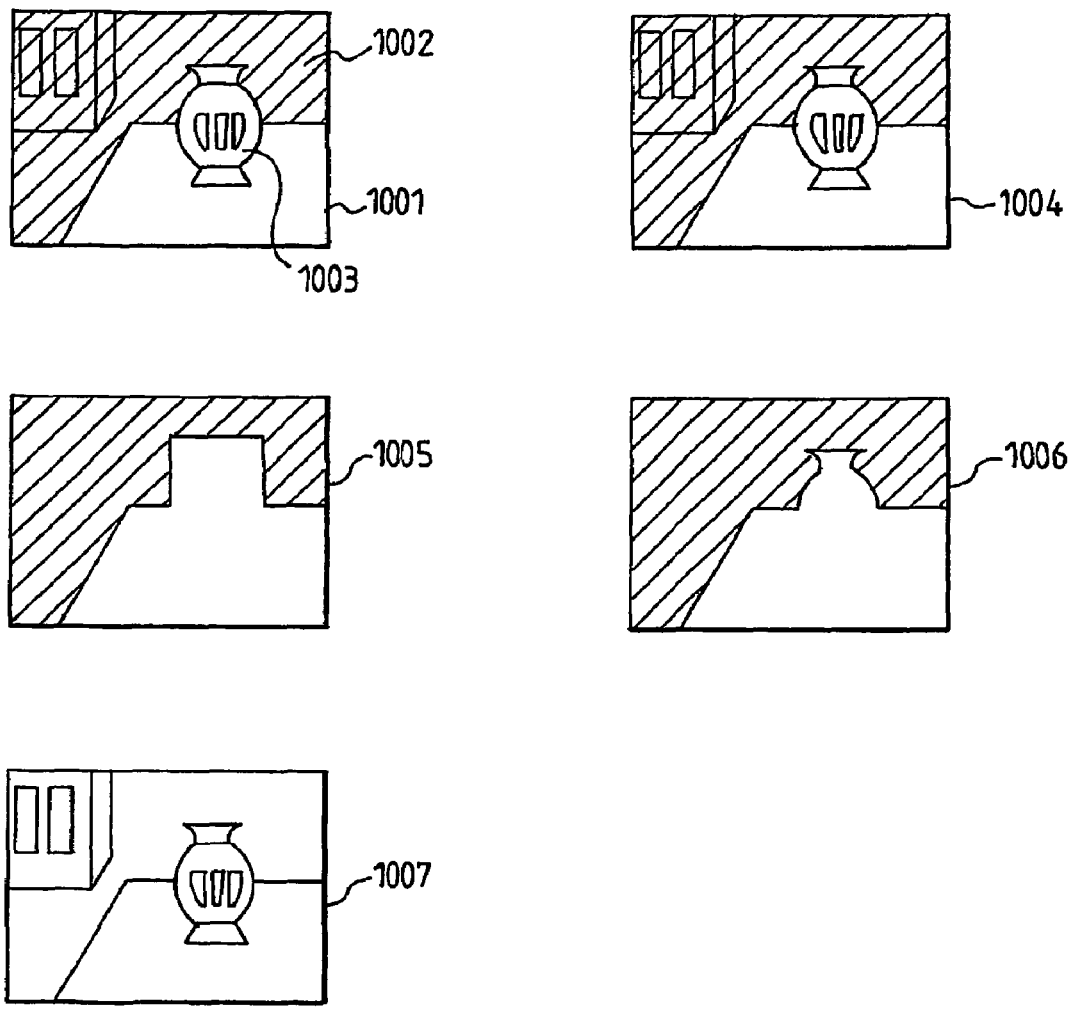

FIG. 10 illustrates this alternative use of the method and system, adopting the general method such as illustrated in FIG. 5 and the alternative version of determination of the determined parameter image using the calculating means (902), which variant is illustrated in FIG. 9. A first determined parameter image (903) is determined by taking, for each zone, the luminance value of the zone as the determined parameter value. The determined parameter value of a zone is chosen as the luminance of the zone. The content of an example of a digital image (100) is represented in a schematic form (1001). The content shows a vase in the first plane, well exposed by a flash, for example, and a poorly exposed and dark part (1002) in the second plane. At (1003) there are illustrated (small) parts of the vase that are naturally dark. The content of the first determined parameter image (903) is illustrated at (1004). The first determined parameter image is modified by the calculating means (902), which will apply a closing filter, for example, to yield the determined parameter image (505) whose content is represented at (1005). The content of the determined parameter image (1005) exhibits variations between the zones in which the digital image (100) and (1001) does not exhibit any. The determined parameter image (505) is regularized into a regularized parameter image (507), whose content is represented at (1006). The digital image (100) is then modified (508) as a function of the regularized parameter image (507) to obtain in this way a modified digital image (509), in which the modifications are differential and quasi-regular per pixel. The content of the modified digital image is then represented at (1007): the dark and large parts of the digital image (1002) are brightened, while the dark and small parts (1003) remain identical. In addition, the edges of the brightened parts coincide perfectly with the initial edges of the digital image, so that the digital image has been modified without the introduction of visual artifacts.

Localization of the Levels Function

We will now describe an alternative use of the method or system consisting in localizing what is known as the levels algorithm. This alternative version will be described in the case of an RGB color photographic image, in which the pixel values for each color plane can have values between 0 and 255.

As zones, there advantageously can be chosen contiguous groups of N×N pixels, where N is an integral number determined, for example, as a function of the number of pixels of the digital image. For each zone, there will be allocated two zone values; the first (respectively the second) being able to be the smaller (respectively the larger) value between the means of the pixel values of the pixels associated with the zone under consideration for each color plane. The two determined parameter values (305) per zone are chosen equal to the zone values (104). There are then obtained two determined parameter images (505) or one determined parameter image (505) composed of two planes or channels.

The determined parameter images (505) are then regularized (506) to produce two regularized parameter images (507). The regularized parameter images (507) advantageously can be obtained by constructing two images for each, a lower regular implicit extension for the first and an upper regular implicit extension for the second.

The modification stage (508) can then be achieved as follows: for each pixel (101), there can be interpolated (1200) a first parameter value relative to the pixel (603) from parameter values of the first regularized parameter image (507) relative to the zones adjacent to the said pixel and the relative position of the pixel in its associated zone. The same procedure will be followed with the second regularized parameter image (507) in order to calculate, for each pixel (101), the second parameter value relative to the said pixel (603). The pixel values (102) of a pixel (101) can then be modified by applying thereto the unique affine transformation (1204), which transforms the first local parameter value to 0 and the second local parameter value to 255.

This alternative use of the modification stage (508) or third calculating means (508) is illustrated in FIG. 12. For each pixel xk of the digital image (100), there are executed the following operations:

the operation of interpolation (1200) of a first local parameter value and of a second local parameter value (1203), the operation of choosing (1201) an affine transformation A (1204) from the two local parameter values (1203) and possibly according to user preferences (1103), the operation of applying (1202) the affine transformation (1104) to the pixel values (102).

Change of White Balance

We will now describe an alternative use of the method or system consisting in localizing an algorithm for local modification of white balance. This alternative version will be described in the case of an RGB color photographic image.

Modification of white balance is commonly used in digital photography in order to neutralize the dominant color of the illuminant of a scene captured in a photo. It is performed in two stages. The first stage, referred to as estimation of the primary illuminant, consisting in estimating the color of the illuminant from the pixel values. The second stage, referred to as the stage of neutralization of the primary illuminant, then modifies the pixel values in order to "neutralize" the estimated color of the illuminant, thus making the digital image perceptually closer to that which an observer of the scene would have seen at the moment of its photographic capture. Examples of such algorithms can be found in the following book: "Color Appearance Models", M. Fairchild, Addison Wesley, 1998, ISBN 0201634643.

However, there exist digital images in which several illuminants are present. This is the case in particular for digital images of sunlit outdoor scenes that contain shaded zones. The part of the scene situated in the sunlight receives the majority of its illumination from the sun, whereas the part of the scene situated in the shade receives the majority of its illumination from the diffuse light of the sky, which is naturally "bluer" than that of the sun.

A global modification of the balance cannot neutralize the two illuminants correctly. The alternative embodiment of the method or system is intended to alleviate this problem.

We then proceed in a manner identical to that of the local gamma version described previously, with the exception of the following changes:

for each zone (103), there is allocated a determined parameter value (203) that can be the result of the stage of estimation of the primary illuminant applied to the digital image portion restricted to the zones adjacent to the said zone, a choice of illuminant, according to a choice function that depends on the mean luminance of the pixels adjacent to the said zone; for example an illuminant corresponding to the sun for high luminance values and an illuminant corresponding to the diffuse light of the sky for low luminance values;

the modification (508) of the pixel values (102) of the digital image (100) then being achieved by applying, to each pixel, a stage of neutralization of the illuminant, by choosing the illuminant as the regularized parameter value of a zone adjacent to the pixel.

The digital image is then modified so as to neutralize an illuminant differentially and quasi-regularly per pixel an illuminant.

Applications of the Invention

The invention has numerous applications. As examples there will be cited: the analog or digital photographic apparatuses, the analog or digital video cameras, the apparatuses for reproduction of fixed or animated images, and the image-processing laboratories or means. The invention can be applied to digitized images originating from and/or intended for various apparatuses, in particular:

an image-capture apparatus, such as a disposable photo apparatus, a digital photo apparatus, a reflex apparatus, a scanner, a fax machine, an endoscope, a camcorder, a surveillance camera, a toy, a camera integrated in or connected to a telephone, to a personal assistant or to a computer, a thermal camera, an echography apparatus, an image-restitution apparatus such as a screen device, a projector, a television set or monitor, virtual-reality goggles or a printer, a more complex apparatus, such as a scanner/fax/printer, a Minilab photo printer, a videoconferencing apparatus.

The method can be integrated in its entirety or in part into a computer, for example, according to one of the following configurations:

In an operating system, such as "Windows" or "Mac OS", the processing means automatically modifies the images originating from or intended for several apparatuses. The method can be applied during input of the image into the system or during a printing request by the user.

In an image-processing application, such as "Photoshop", the processing means automatically modifies the images originating from or intended for several apparatuses, such as scanners, photo apparatuses, printers. The method can be applied when the user activates a filter command in "Photoshop".

In a photo-printing apparatus (such as "Photofinishing" or "Minilab" in English), the processing means modifies the images originating from several photo apparatuses, such as disposable cameras, digital photo apparatuses, compact disks. The method can be applied at the time when printing operations are initiated.

On a server, such as on the Internet, to improve automatically the quality of images originating from several photo apparatuses (such as disposable cameras or digital photo apparatuses). The method can be applied at the time when the images are registered on the server, or at the time when printing operations are initiated.

| NOMENCLATURE | | |
|---|---|---|
| NAME | | Number |
| 1. Digital image | | 100 |
| 1. Pixel(s) | | 101 |
| 1. Pixel value(s) | | 102 |
| 1. Zone(s) | | 103 |
| 1. Adjacent zone | Note: sub-sampling relationship with pixel | 105 |
| Zone adjacent to another zone | | 106 |
| 1. Contiguous zone | Note: variation relationship with zone | 403 |
| 1. Variation of the digital image | | 401 |
| 1. Zone value(s) | | 104 |
| 1. Parameter value(s) | | 203 |
| 1. Parameter image | | 201 and 202 |
| 1. Determined parameter value(s) | | 305 |
| 1. Determined parameter image | | 505 |
| 1. Variation of the parameter image | | 402 |
| 1. Regularized parameter image | | 507 |
| 1. Variation level (of the regularized parameter image) | | 415 |
| 6. Controlled variation image(s) | | 414  or 702 |
| 9. Corrective value | | |
| 9. Adjacent/vicinity | | |
| 10. Parameter value relative to the said determined pixel | | 603 |
| 11. Coefficient | | 1104 |
| 12. First parameter value | | 1203 |
| 12. Second parameter value | | 1203 |
| 12. Affine transformation | | 1204 |
| 15. Dark parts | | 1002 |
| 16. First calculating means | | 504 |
| 16. Second calculating means | | 506 |
| 16. Third calculating means | | 508 |
| 21. First selecting means | | 703 |
| 22. Second selecting means | | 703 |
| 23. Third selecting means | | 703 |
| 25. The operation of interpolating | | |
| 25. Modification | | |
| 26. The operation 1102 of interpolating | | 1100 |
| 26. The operation of calculating | | 1101 |
| 26. The operation of multiplying | | 1102 |
| 30. Fourth calculating means | | 902 |

The invention claimed is:

1. A method for modifying a digital image (100) composed of pixels having pixel values (102); the said digital image being decomposed into zones (103); each of the said pixels being associated with at least one adjacent zone (105); at least one zone value (104) being allocated to each of the said zones Zi (103); at least one parameter value Vpij (203) being allocated to each of the said zones Zi (103); a set of pairs (Zi; Vpij), composed of a zone Zi (103) and of a parameter value Vpij (203) associated with the said zone (103), constituting a parameter image (201);

the said method including:

(a) the stage of determining, for each zone (103), determined parameter values Vpir (305), in particular as a function of the zone values (104) of the said digital image (100); the said parameter image (201) formed in this way being referred to hereinafter as the determined parameter image (505);

the said zone values (104) varying between at least one of the said zones (103) and a contiguous zone (403), the said variation being referred to hereinafter as the variation (401) of the digital image;

the said determined parameter values (305) varying between the said zone (103) and at least one contiguous zone (403), the said variation being referred to hereinafter as the variation of the determined parameter image (402);

the said method additionally including the following stages:

(b) the stage of regularizing the determined parameter image (505) as a function of the said variation (401) of the digital image, by reducing the said variations of the determined parameter image (505) in order to produce a parameter image, referred to hereinafter as the regularized parameter image (507), having a smaller variation level than that of the said variations (401) of the digital image;

(c) the stage of modifying the pixel values (102) of a determined pixel (101) of the said digital image (100) as a function of the parameter values (203) of the said regularized parameter image (507), relative to the zones adjacent to the said determined pixel;

so that the digital image is modified differentially for each of the said pixels and quasi-regularly for the contiguous zones.

2. A method according to claim 1; the said method being such that each zone (103) is composed of one pixel (101).

3. A method according to any one of claims 1 or 2; the said method being such that each zone (103) is composed of a group of contiguous pixels (101).

4. A method according to claim 3; the said determined parameter values (305) being the said zone values (104).

5. A method according to claim 4; the said zone value (104) being the maximum value of the pixel values (102) associated with the said zone (103) and/or the minimum value of the pixel values (102) associated with the said zone (103) and/or a value calculated from the pixel values (102) associated with the said zone (103).

6. A method according to claim 5; a single determined parameter value (305) having been allocated to each zone (103);

the said parameter images (201) whose variation level is smaller than that of the said variations of the digital image being referred to hereinafter as controlled variation images; the said method, in order to reduce the said variations of the determined parameter image and to produce a regularized parameter image (507) having a variation level smaller than that of the said variations of the digital image (100), additionally comprising:

the stage of selecting, from among the controlled variation images, a parameter image that is close (within the meaning of the present invention) to the determined parameter image (505);

so that there is obtained a parameter image constituting the regularized parameter image.

7. A method according to claim 5; a single determined parameter value (305) having been allocated to each zone (103);

the said parameter images whose variation level is smaller than that of the said variations of the digital image being referred to hereinafter as controlled variation images; the said method, in order to reduce the said variations of the determined parameter image (505) and to produce a regularized parameter image (507) having a variation level smaller than that of the said variations of the digital image, additionally including:

the stage of selecting, from among the said controlled variation images, a parameter image (c) (Zi; Vpi(c)) that satisfies the following conditions:

the determined parameter value (Vpij) of the determined parameter image of any zone (Zi) whatsoever is smaller than or equal to the said parameter value (Vpi(c)) of the selected parameter image (c), at least for several zones, the parameter value (Vpi(c)) of the selected parameter image (c) of a zone (Zi) is smaller than or equal to the parameter values (Vpi(q)) for most of the controlled variation images (q) (Zi; Vpi(q)), at least for several zones;

so that there is obtained a parameter image constituting the regularized parameter image.

8. A method according to claim 5; a single determined parameter value (305) having been allocated to each zone (103);

the said parameter images whose variation level is smaller than that of the said variations of the digital image being referred to hereinafter as controlled variation images; the said method, in order to reduce the said variations of the determined parameter image (505) and to produce a regularized parameter image (507) having a variation level smaller than that of the said variations of the digital image, additionally including:

the stage of selecting, from among the said controlled variation images, a parameter image (c) (Zi; Vpi(c)) that satisfies the following conditions:

the determined parameter value (Vpij) of the determined parameter image of any zone (Zi) whatsoever is larger than or equal to the said parameter value (Vpi(c)) of the selected parameter image (c), at least for several zones, the parameter value (Vpi(c)) of the selected parameter image (c) of a zone (Zi) is larger than or equal to the parameter values (Vpi(q)) for most of the controlled variation images (q) (Zi; Vpi(q)), at least for several zones;

so that there is obtained a parameter image constituting the regularized parameter image.

9. A method according to claim 5; the said method, in order to regularize the determined parameter image as a function of the said variation of the digital image, employing the algorithm that includes the following stages:

the stage of determining, for a defined zone Zi, the parameter value Vpi(n+1) of the said pair (Zi; Vpi(n+1)) of the n+1-th parameter image by combining:

the parameter values Vpj (n) and/or VPj (n+1) of the pairs of the n-th image and/or of the n+1-th image whose zones Zj are situated in the vicinity of the said zone Zi with corrective values that are functions of the variations of the digital image between the said zone Zi and the said zones Zj, the stage of iterating the preceding stage step by step;

the said algorithm being initialized by applying it at first to the pairs of the said determined parameter image.

10. A method according to claim 9; the said method, in order to modify the pixel values (102) of a determined pixel (101) of the digital image (100), additionally including the following stages:

the stage of interpolating a parameter value relative to the said determined pixel (603) from parameter values of the said regularized parameter image (507), relative to the zones adjacent to the said determined pixel, the stage of modifying the value of the said determined pixel by employing the parameter value (603) interpolated in this way.

11. A method according to claim 9; a single determined parameter value (305) having been allocated to each zone (103), the said method, in order to modify the pixel values (102) of a determined pixel (101) of the said digital image (100), additionally including the following stages:
the stage of interpolating a parameter value relative to the said determined pixel (603) from parameter values of the said regularized parameter image (507), relative to the zones adjacent to the said determined pixel,
the stage of calculating a coefficient (1104) by applying a predetermined function, especially the gamma, to the parameter value (603) interpolated in this way,
the stage of multiplying the pixel values (102) of the said determined pixel by the said coefficient (1104).

12. A method according to claim 9; two determined parameter values having been allocated to each zone, referred to hereinafter as the first parameter value and the second parameter value; the said method, in order to modify the pixel values (102) of a determined pixel (101) of the said digital image (100), additionally including the following stages:
the stage of interpolating a first parameter value relative to the said determined pixel from the said first parameter values of the said regularized parameter image (507), relative to the zones adjacent to the said determined pixel,
the stage of interpolating a second parameter value relative to the said determined pixel from the said second parameter values of the said regularized parameter image (507), relative to the zones adjacent to the said determined pixel,
the stage of choosing an affine transformation (1204) as a function of the said first parameter value and the said second parameter value interpolated in this way,
the stage of applying the said affine transformation (1204) to each of the pixel values.

13. A method according to claim 12; the said method, in order to modify the pixel values of a determined pixel of the said digital image, additionally including the following stages:
the stage of calculating a coefficient as a function of the parameter values of the said regularized parameter image and of the pixel values,
the stage of calculating each pixel value of the said determined pixel as a function of the said coefficient and of the said pixel values of the said determined pixel.

14. A method according to claim 13; the said method, in order to modify the pixel values of a determined pixel of the said digital image, additionally including the following stages:
the stage of calculating a coefficient as a function of the parameter values of the said regularized parameter image and of the pixel values,
the stage of multiplying each pixel value of the said determined pixel by the said coefficient.

15. A method according to claim 14; the said method being intended to augment the luminosity of the dark parts (1002) of the said digital image; the said method being additionally more particularly to preserve the luminosity of those parts of the said digital image that are dark and of small extent;
the said method additionally including the stage of calculating the determined parameter values of the zones of the said parts that are dark and of small extent, from the determined parameter values of the adjacent zones, so that the difference between the determined parameter values for the zones in question is small.

16. A system for modifying a digital image (100) composed of pixels (101) having pixel values (102); the said digital image (100) being decomposed into zones Zi (103); each of the said pixels (101) being associated with at least one adjacent zone; at least one zone value (104) being allocated to each of the said zones Zi (103); at least one parameter value Vpij (203) being allocated to each of the said zones Zi (103); a set of pairs (Zi; Vpij), composed of a zone Zi (103) and of a parameter value Vpij (203) associated with the said zone Zi (103), constituting a parameter image (201);
the said system including:
(a) a first calculating means (504) making it possible to determine, for each zone (103), determined parameter values Vpir (305), in particular as a function of the zone values (104) of the said digital image (100); the said parameter image formed in this way being referred to hereinafter as the determined parameter image (505);
the said zone values (104) varying between at least one of the said zones and a contiguous zone, the said variation being referred to hereinafter as the variation (401) of the digital image;
the said determined parameter values (305) varying between the said zone and at least one contiguous zone, the said variation being referred to hereinafter as the variation of the determined parameter image;
the said system additionally including 1:
(b) a second calculation means (506) making it possible to regularize the determined parameter image (505) as a function of the said variation (401) of the digital image, by reducing the said variations of the determined parameter image in order to produce a parameter image referred to hereinafter as the regularized parameter image (507) having a smaller variation level than that of the said variations (401) of the digital image;
(c) a third calculating means (508) making it possible to modify the pixel values (102) of a determined pixel (101) of the said digital image (100) as a function of the parameter values of the said regularized parameter image (507), relative to the zones adjacent to the said determined pixel;
so that the said digital image is modified differentially for each of the said pixels and quasi-regularly for the contiguous zones.

17. A system according to claim 16; the said system being such that each zone (103) is composed of one pixel (101).

18. A system according to any one of claims 16 or 17; the said system being such that each zone (103) is composed of a group of contiguous pixels (101).

19. A system according to claim 18; the said determined parameter values (305) being the said zone values (104).

20. A system according to claim 19; the said zone value (104) being the maximum value of the pixel values (102) associated with the said zone and/or the minimum value of the pixel values (102) associated with the said zone (103) and/or a value calculated from the pixel values (102) associated with the said zone.

21. A system according to claim 20; a single determined parameter value (305) having been allocated to each zone (103);
the said parameter images whose variation level is smaller than that of the said variations (401) of the digital image being referred to hereinafter as controlled variation images; the said system, in order to reduce the said variations of the determined parameter image (505) and to produce a regularized parameter image (507) having a variation level smaller than that of the said variations of the digital image, additionally comprising:

first selection means (703) for selecting, from among the said controlled variation images, a parameter image close (within the meaning of the present invention) to the determined parameter image (505);

so that there is obtained a parameter image constituting the regularized parameter image.

22. A system according to claim 20; a single determined parameter value (305) having been allocated to each zone (103);

the said parameter images whose variation level is smaller than that of the said variations of the digital image being referred to hereinafter as controlled variation images; the said system, in order to reduce the said variations of the determined parameter image (505) and to produce a regularized parameter image (507) having a variation level smaller than that of the said variations of the digital image, additionally including:

second selecting means (703) for selecting, from among the said controlled variation images, a parameter image (c) (Zi; Vpi(c)) that satisfies the following conditions:

the determined parameter value (Vpij) of the determined parameter image of any zone (Zi) whatsoever is smaller than or equal to the said parameter value (Vpi(c)) of the selected parameter image (c), at least for several zones, the parameter value (Vpi(c)) of the selected parameter image (c) of a zone (Zi) is smaller than or equal to the parameter values (Vpi(q)) for most of the controlled variation images (q) (Zi; Vpi(q)), at least for several zones;

so that there is obtained a parameter image constituting the regularized parameter image.

23. A system according to claim 20; a single determined parameter value (203) having been allocated to each zone (103);

the said parameter images whose variation level is smaller than that of the said variations of the digital image being referred to hereinafter as controlled variation images; the said system, in order to reduce the said variations of the determined parameter image (505) and to produce a regularized parameter image (507) having a variation level smaller than that of the said variations of the digital image, additionally including:

third selecting means (703) for selecting, from among the said controlled variation images, a parameter image (c) (Zi; Vpi(c)) that satisfies the following conditions:

the determined parameter value (Vpij) of the determined parameter image of any zone (Zi) whatsoever is larger than or equal to the said parameter value (Vpi(c)) of the selected parameter image (c), at least for several zones, the parameter value (Vpi(c)) of the selected parameter image (c) of a zone (Zi) is larger than or equal to the parameter values (Vpi(q)) for most of the controlled variation images (q) (Zi; Vpi(q)), at least for several zones;

so that there is obtained a parameter image constituting the regularized parameter image.

24. A system according to claim 20; the said system, in order to regularize the determined parameter image as a function of the said variation of the digital image, employing an algorithm that includes the following stages of calculation:

the stage of determining, for a defined zone Zi, the parameter value Vpi(n+1) of the said pair (Zi; Vpi(n+1)) of the n+1-th parameter image by combining:

the parameter values Vpj(n) and/or Vpj(n+1) of the pairs of the n-th image and/or of the n+1-th image whose zones Zj are situated in the vicinity of the said zone Zi with corrective values that are functions of the variations of the digital image between the said zone Zi and the said zones Zj, the stage of iterating the preceding stage step by step;

the said algorithm being initialized by applying it at first to the pairs of the determined parameter image.

25. A system according to claim 24; the said third calculating means (508), in order to modify the pixel values of a determined pixel of the said digital image, executing the following operations:

the operation (602) of interpolating a parameter value relative to the said determined pixel from parameter values of the said regularized parameter image, relative to the zones adjacent to the said determined pixel, the operation (604) of modifying the value of the said determined pixel by employing the parameter value interpolated in this way.

26. A system according to claim 24; a single determined parameter value having been allocated to each zone; the said third calculating means (508), in order to modify the pixel values of a determined pixel of the said digital image, executing the following operations:

the operation (1100) of interpolating a parameter value relative to the said determined pixel from parameter values of the said regularized parameter image, relative to the zones adjacent to the said determined pixel, the operation (1101) of calculating a coefficient by applying a predetermined function, especially the gamma, to the parameter value interpolated in this way, the operation (1102) of multiplying the pixel values of the said determined pixel by the said coefficient.

27. A system according to claim 24; two determined parameter values having been allocated to each zone, referred to hereinafter as the first parameter value and the second parameter value; the said third calculating means, in order to modify the pixel values of a determined pixel of the said digital image, executing the following operations:

the operation comprising interpolating a first parameter value relative to the said determined pixel from the said first parameter values of the said regularized parameter image, relative to the zones adjacent to the said determined pixel, the operation comprising interpolating a second parameter value relative to the said determined pixel from the said second parameter values of the said regularized parameter image, relative to the zones adjacent to the said determined pixel, the operation consisting in choosing an affine transformation as a function of the said first parameter value and the said second parameter value interpolated in this way, the operation consisting in applying the said affine transformation to each of the pixel values.

28. A system according to claim 27; the said third calculating means (508), in order to modify the pixel values of a determined pixel of the said digital image, executing the following operations:

the operation consisting in calculating a coefficient as a function of the parameter values of the said regularized parameter image and of the pixel values, the operation consisting in calculating each pixel value of the said determined pixel as a function of the said coefficient and of the said pixel values of the said determined pixel.

29. A system according to claim 28; the said third calculating means (508), in order to modify the pixel values of a determined pixel of the said digital image, executing the following operations:

the operation consisting in calculating a coefficient as a function of the parameter values of the said regularized parameter image and of the pixel values, the operation consisting in multiplying each pixel value of the said determined pixel by the said coefficient.

30. A system according to claim 29; the said system being intended to augment the luminosity of the dark parts (1002) of the said digital image (100); the said system being additionally more particularly to preserve the luminosity of those parts of the said digital image (100) that are dark and of small extent;

the said system additionally including a fourth calculating means (902) for calculating the determined parameter values of the zones of the said parts that are dark and of small extent, from the determined parameter values of the adjacent zones, so that the difference between the determined parameter values for the zones in question is small.

* * * * *